(12) United States Patent
Satomi et al.

(10) Patent No.: US 10,872,249 B2
(45) Date of Patent: Dec. 22, 2020

(54) DISPLAY CONTROL DEVICE, DISPLAY CONTROL SYSTEM, DISPLAY CONTROL METHOD, AND NON-TRANSITORY STORAGE MEDIUM

(71) Applicant: JVCKENWOOD Corporation, Yokohama (JP)

(72) Inventors: Tsuneo Satomi, Yokohama (JP); Ichiro Ishida, Yokohama (JP); Naoto Hayashi, Yokohama (JP); Yoshiyuki Shimizu, Yokohama (JP)

(73) Assignee: JVCKENWOOD Corporation, Yokohama (JP)

(*) Notice: Subject to any disclaimer, the term of this patent is extended or adjusted under 35 U.S.C. 154(b) by 0 days.

(21) Appl. No.: 16/596,816

(22) Filed: Oct. 9, 2019

(65) Prior Publication Data
US 2020/0042805 A1    Feb. 6, 2020

Related U.S. Application Data

(63) Continuation of application No. PCT/JP2018/014143, filed on Apr. 2, 2018.

(30) Foreign Application Priority Data

Sep. 19, 2017 (JP) ................... 2017-179372
Sep. 19, 2017 (JP) ................... 2017-179373

(51) Int. Cl.
*H04N 9/47* (2006.01)
*G06K 9/00* (2006.01)
(Continued)

(52) U.S. Cl.
CPC ............ *G06K 9/00812* (2013.01); *B60R 1/00* (2013.01); *G06K 9/00805* (2013.01);
(Continued)

(58) Field of Classification Search
CPC ............... B60R 1/00; B60R 2300/105; B60R 2300/301; B60R 2300/607;
(Continued)

(56) References Cited

U.S. PATENT DOCUMENTS

2006/0287826 A1* 12/2006 Shimizu ............... B60Q 1/0023
701/431
2007/0057816 A1*  3/2007 Sakakibara ........ B62D 15/0275
340/932.2
(Continued)

FOREIGN PATENT DOCUMENTS

EP    2620330    7/2013
EP    3037302    6/2016
(Continued)

OTHER PUBLICATIONS

International Search Report and Written Opinion for International Patent Application No. PCT/JP2018/014143 dated Jul. 3, 2018, 9 pages.
(Continued)

*Primary Examiner* — Gims S Philippe
(74) *Attorney, Agent, or Firm* — Amin, Turocy & Watson, LLP

(57) ABSTRACT

A display control device includes a video data obtaining unit configured to obtain video data from multiple image capturing units which captures images of surrounding of a vehicle, an bird's-eye view image generating unit configured to perform a viewpoint conversion process and a synthesizing process to the obtained video data to generate an bird's-eye view image, a determining unit configured to obtain information related to a parking operation of the vehicle within a parking operation range including a parking slot in which the vehicle is to be parked to determine that the parking operation required time and effort, and a display controller configured to, when the determining unit deter-
(Continued)

mines that the parking operation required time and effort, display the generated bird's-eye view image in a display at a time of exit of the vehicle from the parking slot by being driven forward.

9 Claims, 18 Drawing Sheets

(51) Int. Cl.
*B60R 1/00* (2006.01)
*H04N 7/18* (2006.01)

(52) U.S. Cl.
CPC ........ *H04N 7/181* (2013.01); *B60R 2300/105* (2013.01); *B60R 2300/301* (2013.01); *B60R 2300/607* (2013.01); *B60R 2300/806* (2013.01)

(58) Field of Classification Search
CPC .......... B60R 2300/70; B60R 2300/806; G06K 9/00791; G06K 9/00805; G06K 9/00812; H04N 7/18
USPC ........................................................ 348/148
See application file for complete search history.

(56) References Cited

U.S. PATENT DOCUMENTS

| | | | |
|---|---|---|---|
| 2007/0085901 A1* | 4/2007 | Yang | G06T 3/4038 348/47 |
| 2013/0096816 A1* | 4/2013 | Takano | B62D 15/0275 701/400 |
| 2013/0162825 A1* | 6/2013 | Yoon | G01S 15/931 348/148 |
| 2014/0036063 A1 | 2/2014 | Kim et al. | |
| 2015/0210213 A1* | 7/2015 | Mitsuta | B60Q 5/001 340/435 |
| 2019/0160971 A1* | 5/2019 | Fukushima | B60L 53/38 |

FOREIGN PATENT DOCUMENTS

| | | |
|---|---|---|
| JP | 2012-176747 | 9/2012 |
| JP | 2015-076645 | 4/2015 |

OTHER PUBLICATIONS

Extended European Search Report for European Patent Application No. 18859419.6 dated Mar. 11, 2020.

* cited by examiner

DISPLAY CONTROL DEVICE, DISPLAY CONTROL SYSTEM, DISPLAY CONTROL METHOD, AND NON-TRANSITORY STORAGE MEDIUM

CROSS-REFERENCE TO RELATED APPLICATIONS

This application is a continuation of PCT International Application No. PCT/JP2018/014143 filed in Japan on Apr. 2, 2018, which claims priority to and incorporates by references the entire contents of Japanese Patent Application No. 2017-179372 filed in Japan on Sep. 19, 2017 and Japanese Patent Application No. 2017-179373 filed in Japan on Sep. 19, 2017.

FIELD

The present application relates to a display control device, a display control system, a display control method, and a non-transitory storage medium.

BACKGROUND

A technology related to a vehicle-surrounding display device is known in which a bird's-eye view image of a vehicle is displayed along with an image of the vehicle itself (for example, see Japanese Laid-open Patent Publication No. 2015-076645). According to that technology, when a travelling direction of the vehicle changes from a forward direction to a backward direction, a display area of the bird's-eye view image for a rear view of the vehicle is expanded.

SUMMARY

As described in Japanese Laid-open Patent Publication No. 2015-076645, since the bird's-eye view image of the vehicle is mainly aimed at providing parking assistance, it is displayed at a time of entry into a parking slot by being driven backward. As a result, at the time of the entry into the parking slot by being driven backward, the driver views the bird's-eye view image and checks surrounding situation including blind spots for visual confirmation or mirrors.

Since the bird's-eye view image is not displayed at a time of exit from the parking slot, the driver checks the surrounding situation by visual confirmation or by the mirrors. As compared to the entry into the parking slot by being driven backward, an operation for the exit from the parking slot by being driven forward is easier. However, for example, when a lot of time and effort was required for the entry into the parking slot by being driven backward, it may be desirable, at the time of the exit from the parking slot by being driven forward, to check the surrounding situation not only by the visual confirmation or by the mirrors but also by viewing the bird's-eye view image. Meanwhile, when the bird's-eye view image is displayed regardless of the surrounding situation at the time of the exit from the parking slot by being driven forward, the bird's-eye view image may be displayed for a situation in which the bird's-eye view image is not required and a situation in which a route has to be checked by a navigation system.

A display control device, a display control system, a display control method, and a non-transitory storage medium are disclosed.

According to one aspect, there is provided a display control device comprising: a video data obtaining unit configured to obtain video data from multiple image capturing units which capture images of surrounding of a vehicle; an bird's-eye view image generating unit configured to perform a viewpoint conversion process and a synthesizing process to the video data obtained by the video data obtaining unit to generate an bird's-eye view image; a determining unit configured to obtain information related to a parking operation of the vehicle within a parking operation range including a parking slot in which the vehicle is to be parked to determine that the parking operation within the parking operation range required time and effort; and a display controller configured to, when the determining unit determines that the parking operation within the parking operation range required time and effort, display the bird's-eye view image which is generated by the bird's-eye view image generating unit in a display at a time of exit of the vehicle from the parking slot by being driven forward.

According to one aspect, there is provided a display control method comprising: a video data obtaining step of obtaining video data from multiple image-capturing units which capture images of surrounding of a vehicle; an bird's-eye view image generating step of performing a viewpoint conversion process and a synthesizing process to the video data obtained at the video data obtaining step and generating an bird's-eye view image; a determining step of obtaining information related to a parking operation of the vehicle within a parking operation range including a parking slot in which the vehicle is to be parked and determining that the parking operation within the parking operation range required time and effort; and a display controlling step of, when it is determined at the determining step that the parking operation within the parking operation range required time and effort, displaying the bird's-eye view image which is generated at the bird's-eye view image generating step at a time of exit of the vehicle from the parking slot by being driven forward.

According to one aspect, there is provided a non-transitory storage medium that stores a program that causes a computer, which functions as a display control device, to execute: a video data obtaining step of obtaining video data from multiple image-capturing units which capture images of surrounding of a vehicle; an bird's-eye view image generating step of performing a viewpoint conversion process and a synthesizing process to the video data obtained at the video data obtaining step and generating an bird's-eye view image; a determining step of obtaining information related to a parking operation of the vehicle within a parking operation range including a parking slot in which the vehicle is to be parked and determining that the parking operation within the parking operation range required time and effort; and a display controlling step of, when it is determined at the determining step that the parking operation within the parking operation range required time and effort, displaying the bird's-eye view image which is generated at the bird's-eye view image generating step at a time of exit of the vehicle from the parking slot by being driven forward.

The above and other objects, features, advantages and technical and industrial significance of this application will be better understood by reading the following detailed description of presently preferred embodiments of the application, when considered in connection with the accompanying drawings.

DETAILED DESCRIPTION OF THE PREFERRED EMBODIMENTS

Exemplary embodiments of a display control device 40, a display control system 1, a display control method, and a program according to the present application are described below in detail with reference to accompanying drawings. However, the present application is not limited by the embodiments described below.

First Embodiment

Figure 1:
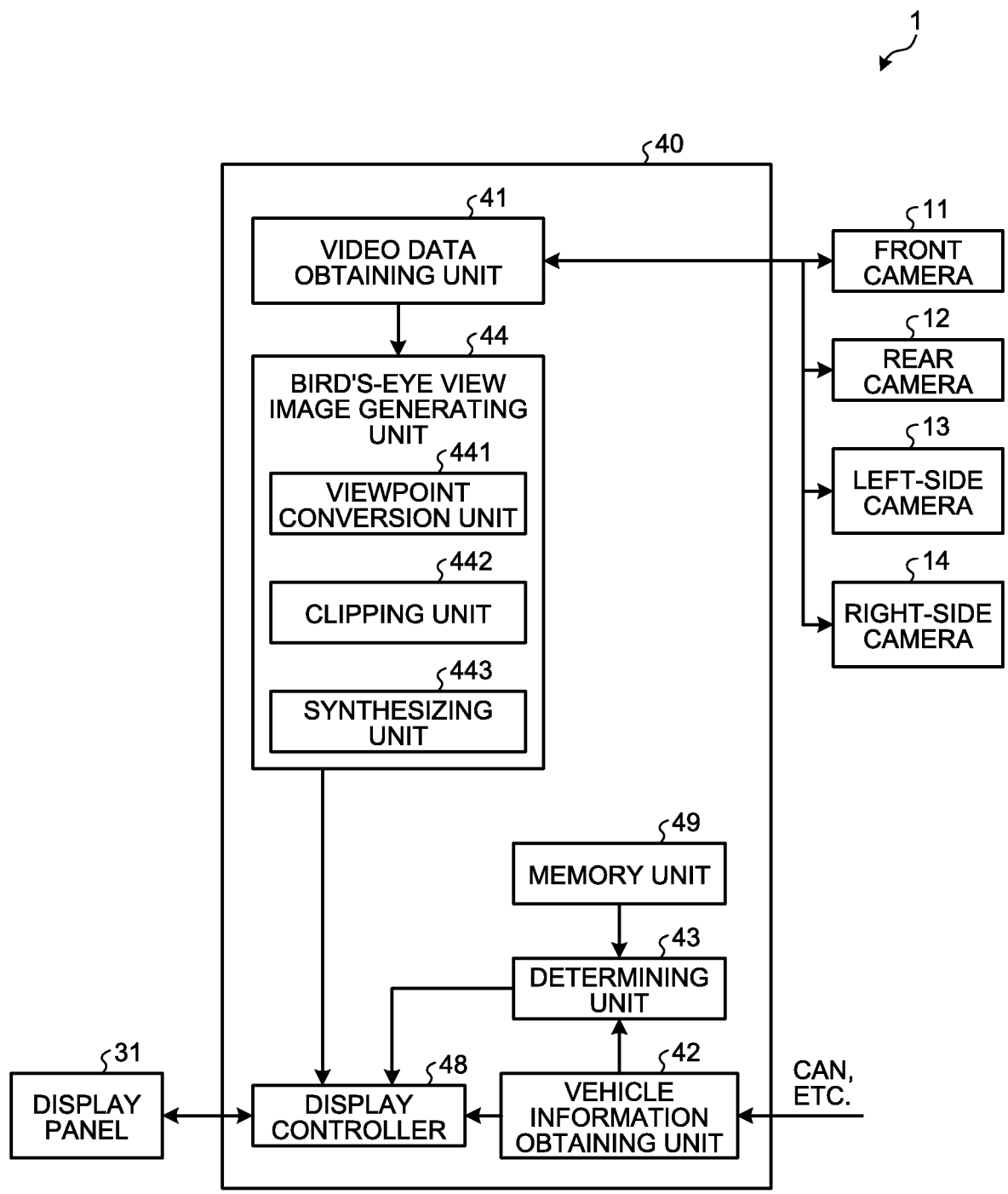
FIG. 1 is a block diagram illustrating an exemplary configuration of a display control system according to a first embodiment.
Figure 2:
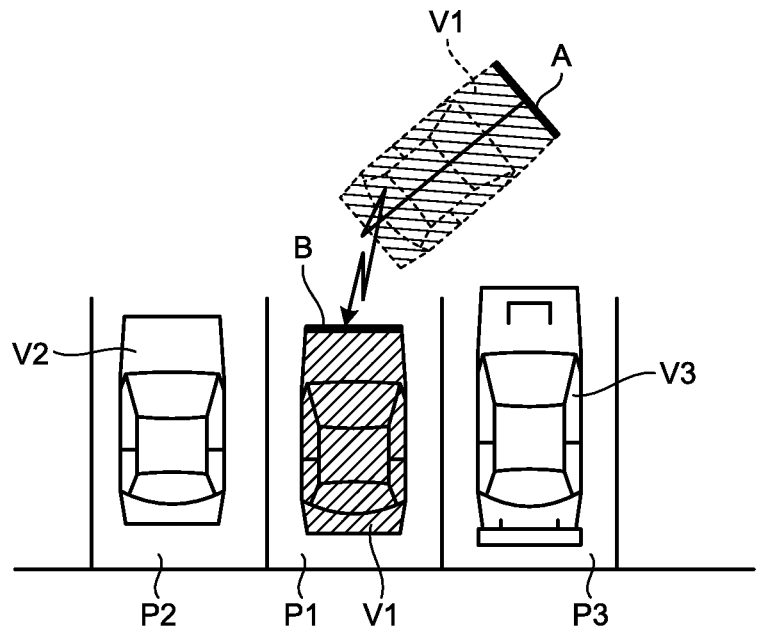
FIG. 2 is a diagram for explaining parking slots, and illustrates a state of entry therein.

FIG. 1 is a block diagram illustrating an exemplary configuration of a display control system according to a first embodiment. FIG. 2 is a diagram for explaining parking slots, and illustrates a state of entry therein. In the display control system 1, according to operations performed within a parking operation range, an bird's-eye view image 100 is displayed in an appropriate manner. The display control system 1 is installed in a vehicle V1. In addition to the display control system 1 installed in the vehicle V1, the display control system 1 of a portable system may be used in the vehicle V1.

In the first embodiment, the vehicle V1 is parked in a parking slot P1. A parking slot P2 is provided on a left-hand side when viewed from the vehicle V1. Similarly, a parking slot P3 is provided on a right-hand side when viewed from the vehicle V1. An adjacent vehicle V2 is parked in the parking slot P2. Similarly, an adjacent vehicle V3 is parked in the parking slot P3.

Explained below with reference to FIG. 1 is the display control system 1. The display control system 1 includes a front camera (an image-capturing unit) 11, a rear camera (an image-capturing g unit) 12, a left-side camera (an image-capturing unit) 13, a right-side camera (an image-capturing unit) 14, a display panel (a display) 31, and the display control device 40.

The front camera 11 is a camera for an bird's-eye view image. The front camera 11 is installed in a front side of the vehicle V1, and captures a video of the surrounding of the vehicle with the focus on a front view of the vehicle V1. For example, the front camera 11 captures the video in a shooting range of about 180°. The shooting range includes a wider range in the front side of the vehicle V1 than a display range of the bird's-eye view image 100. Then, the front camera 11 outputs the captured video to a video data obtaining unit 41 of the display control device 40.

The rear camera 12 is a camera for the bird's-eye view image. The rear camera 12 is installed in a rear side of the vehicle V1, and captures a video of the surrounding of the vehicle with the focus on a rear view of the vehicle V1. For example, the rear camera 12 captures the video in a shooting range of about 180°. The shooting range includes a wider range in the rear side of the vehicle V1 than the display range of the bird's-eye view image 100. Then, the rear camera 12 outputs the captured video to the video data obtaining unit 41 of the display control device 40.

The left-side camera 13 is a camera for the bird's-eye view image. The left-side camera 13 is installed in a left-hand side of the vehicle V1, and captures a video of the surrounding of the vehicle with the focus on a left-hand view of the vehicle V1. For example, the left-side camera 13 captures the video in a shooting range of about 180°. The shooting range includes a wider range in the left-hand side of the vehicle V1 than the display range of the bird's-eye view image 100. Then, the left-side camera 13 outputs the captured video to the video data obtaining unit 41 of the display control device 40.

The right-side camera 14 is a camera for the bird's-eye view image. The right-side camera 14 is installed in a right-hand side of the vehicle V1, and captures a video of the surrounding of the vehicle with the focus on a right-hand view of the vehicle V1. For example, the right-side camera 14 captures the video in a shooting range of about 180°. The shooting range includes a wider range in the right-hand side of the vehicle V1 than the display range of the bird's-eye view image 100. Then, the right-side camera 14 outputs the captured video to the video data obtaining unit 41 of the display control device 40.

Thus, using the front camera 11, the rear camera 12, the left-side camera 13, and the right-side camera 14, all directions surrounding the vehicle V1 are captured.

The display panel 31 is a display used in a shared manner with other systems such as a navigation system. The display panel 31 is a monitor enabling checking of the surrounding of the vehicle V1 at necessary timings. As long as the surrounding of the vehicle V1 can be checked, the display panel 31 can be configured in various manners. As an example of the display panel, an electronic rearview mirror can be used, or an instrument panel can be configured to have a function of the display panel. For example, the display panel 31 is a display such as an LCD (Liquid Crystal Display) or an organic EL (Organic Electro-Luminescence) display. The display panel 31 is disposed at an easily visible position for the driver. In the first embodiment, the display panel 31 is disposed in a dashboard, or in an instrument panel, or in a center console present in a front side of the driver of the vehicle V1. The display panel 31 displays the bird's-eye view image 100 of the vehicle V1 based on the video signals output from a display controller 48 of the display control device 40.

The display control device 40 provides information for assisting the parking. More specifically, the display control device 40 generates and displays the bird's-eye view image 100 at a time of entry into a parking slot and at a time of exit from the parking slot.

The display control device 40 is an arithmetic processing device (a controller) configured using, for example, a CPU (Central Processing Unit) or an image processor. The display control device 40 loads a program, which is stored in a storage 49, into a memory and executes instructions written in the program. The display control device 40 includes the video data obtaining unit 41, a vehicle information obtaining unit 42, a determining unit 43, an bird's-eye view image generating unit 44, the display controller 48, and the storage 49 as an internal memory. The display control device 40 can be configured using one or more devices.

The video data obtaining unit 41 obtains video data of the surrounding of the vehicle V1. More specifically, the video data obtaining unit 41 obtains video data output by the front camera 11, the rear camera 12, the left-side camera 13, and the right-side camera 14. Then, the video data obtaining unit 41 outputs the obtained video data to the bird's-eye view image generating unit 44.

The vehicle information obtaining unit 42 obtains vehicle information such as gear operation information of the vehicle V1 which can be used for a parking start trigger or a parking end trigger as a parking assistance display trigger from a CAN (Controller Area Network) and various sensors for detecting a condition of the vehicle V1. The vehicle information obtaining unit 42 obtains, as the vehicle information, a velocity of the vehicle V1 within the parking operation range obtained from the CAN and the various sensors, and operation information of a steering operation performed within the parking operation range. Then, the vehicle information obtaining unit 42 outputs the obtained vehicle information to the determining unit 43 and the display controller 48.

The determining unit 43 obtains the operation information of the vehicle V1 within the parking operation range that includes the parking slot P1 in which the vehicle V1 is to be parked, and determines that a count of adjustment of a vehicle orientation within the parking operation range is equal to or greater than a threshold value. More specifically, based on the vehicle information obtained by the vehicle information obtaining unit 42, the determining unit 43 obtains the operation information of the vehicle V1 within the parking operation range that includes the parking slot P1 for the vehicle V1. Then, based on the obtained operation information, the determining unit 43 determines whether or not the count of the adjustment of the vehicle orientation within the parking operation range is equal to or greater than a predetermined threshold value.

The parking operation range includes the parking slot P1, in which the vehicle V1 is to be parked, and the surrounding of the parking slot P1. The parking slot P1 can be determined by performing image processing with respect to the video data obtained by the display control device 40, or can be specified by the user. The parking operation range represents a range in which the vehicle V1 is operated at the time of the entry into the parking slot. More specifically, the parking operation range represents a range in which the vehicle V1 passes while being driven backward at the time of the entry into the parking slot. The parking operation range represents a range in which the vehicle V1 is operated at the time of the exit from the parking slot. Moreover, the parking operation range represents a range in which the vehicle V1 passes while being driven forward at the time of the exit from the parking slot. For example, a range including a predetermined distance from the parking slot P1 for the vehicle V1 is defined as the parking operation range. The predetermined distance is set to 5.5 m, for example. Alternatively, the predetermined distance can be obtained by adding 1 m to the total length of the vehicle V1. That is, when a rear end of the vehicle V1 reaches a position that is 1 m away in a front side from a front end of the vehicle V1 in the parked state, the vehicle reaches the parking operation range.

A completion of the entry of the vehicle V1 into the parking slot is detected when, for example, a gearshift lever in the vehicle V1 is set to "reverse" and, after the vehicle V1 has moved backward, the gearshift lever in the vehicle V1 is set to "parking" or "neutral", when the velocity of the vehicle V1 is kept to be zero for a period of five seconds or more, when an engine has stopped, or when a parking brake or a foot brake is applied. Alternatively, the completion of the entry of the vehicle V1 into the parking slot by being driven backward is detected by an arbitrary trigger such as a user operation.

The exit of the vehicle V1 from the parking slot by being driven forward is detected, for example, when the engine has started from the parking state in which the parking brake or the foot brake is applied, when the gearshift lever is set to "drive", or when the parking brake or the foot brake is released. Alternatively, the exit of the vehicle V1 from the parking slot by being driven forward is detected by an arbitrary trigger such as a user operation.

The count of the adjustment of the vehicle orientation is the number of times for which the orientation of the vehicle V1 is adjusted to follow the appropriate route within the parking operation range. More specifically, the count of the adjustment of the vehicle orientation at the time of the entry into the parking slot is the number of times for which the orientation of the vehicle V1 is adjusted within the parking operation range for the appropriate entry into the parking slot. The count of the adjustment of the vehicle orientation at the time of the exit from the parking slot is the number of times for which the orientation of the vehicle V1 is adjusted within the parking operation range for the appropriate exit from the parking slot.

In the first embodiment, based on the operation information, the determining unit 43 determines whether or not a count of turning back of the steering till the vehicle V1 is parked in the parking slot is equal to or greater than a predetermined threshold value.

Figure 3:
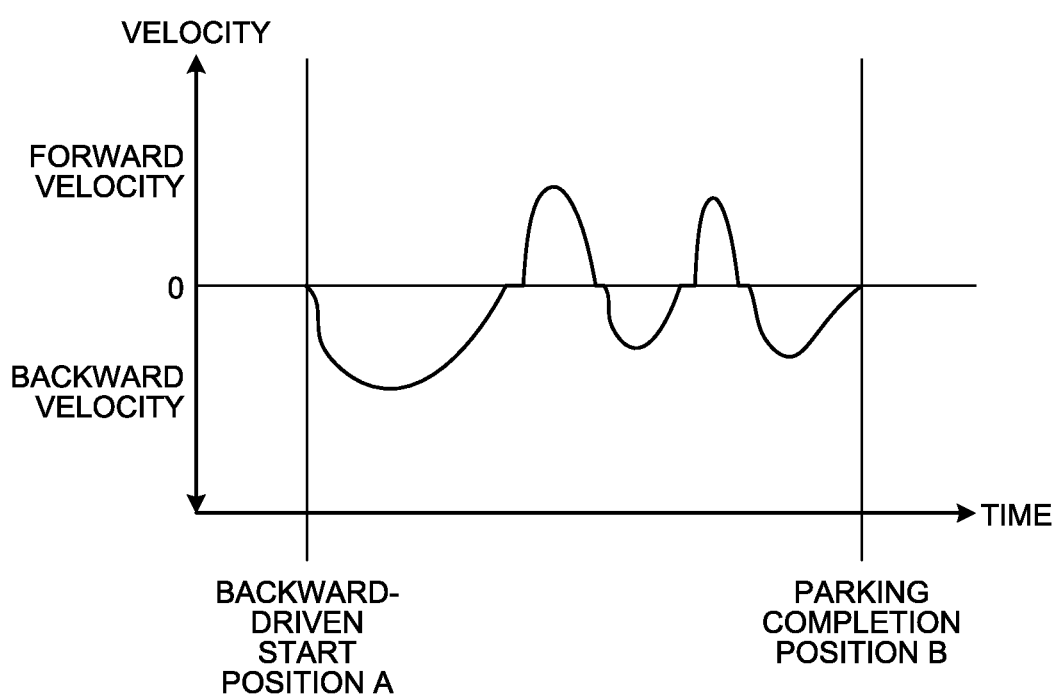
FIG. 3 is a diagram for explaining an example of a change of velocity of the vehicle at the time of the entry into the parking slot.

The explanation about the turning back of the steering is given below with reference to FIGS. 2 and 3. FIG. 3 is a diagram for explaining an example of a change of a velocity of the vehicle at the time of the entry into the parking slot. Herein, the turning back of the steering means a situation in which, in order to adjust an orientation of the vehicle V1, as illustrated in FIG. 2, after being driven backward from a backward-driven start position A, the vehicle V1 is driven forward, and then again driven backward to be parked at a parking completion position B. Whether the vehicle V1 is driven backward or driven forward can be determined according to the travelling direction and the velocity of the vehicle V1. Regarding the count of the turning back of the steering, every time the vehicle V1 is driven forward after the vehicle V1 has been started to be driven backward, the count of the turning back of the steering is incremented by one. When the count of the turning back of the steering is two, a relationship between the velocity and time from the backward-driven start position A to the parking completion position B becomes one as illustrated in FIG. 3.

The threshold value can be calculated by, for example, multiplying a predetermined coefficient to a standard count of turning back of a steering at the time of the entry into the parking slot regardless of a vehicle and a parking slot. For example, the predetermined coefficient can be set to 2, and the threshold value can be set to be double the standard count of turning back of the steering at the time of the entry into the parking slot.

For example, an average value of the counts of the turning back of the steering can be calculated based on a history of the operation information obtained at the time of the entry of the vehicle V1 into the parking slot, and the threshold value can be calculated by multiplying a predetermined coefficient to the average value. Alternatively, the average value can be calculated based on the count of the turning back of the steering at the time of the entry into the parking slot for each driver, and the threshold value can be calculated by multiplying a predetermined coefficient to the average value.

For example, the average value of the counts of the turning back of the steering can be calculated based on the history of the operation information at the time of the entry of each unspecified vehicle in the target parking slot, and the threshold value can be calculated by multiplying a predetermined coefficient to the average value. For the parking with multiple parking slots, the average value of the counts of the turning back of the steering of unspecified vehicles in the whole parking can be calculated without distinguishing the parking slots, and the threshold value can be calculated by multiplying a predetermined coefficient to the average value. The history of the operation information at the time of the entry of each unspecified vehicle into the parking slot is referred to from, for example, a database which is managed by a management company of the parking, an automobile manufacturer or a navigation manufacturer and in which the operation information is collected and stored.

The bird's-eye view image generating unit 44 performs a viewpoint conversion operation and a synthesizing operation on surrounding video data obtained by the video data obtaining unit 41, and generates the bird's-eye view image 100. The bird's-eye view image generating unit 44 generates the bird's-eye view image 100 at the time of the entry of the vehicle into the parking slot. Moreover, at the time of the exit of the vehicle from the parking slot, when the determining unit 43 determines that the count of the adjustment of the vehicle orientation is equal to or greater than the threshold value, then the bird's-eye view image generating unit 44 generates the bird's-eye view image 100. Furthermore, in the first embodiment, when the determining unit 43 determines that the count of the turning back of the steering until the vehicle V1 is parked in the parking slot is equal to or greater than the predetermined threshold value, then the bird's-eye view image generating unit 44 generates the bird's-eye view image 100. Subsequently, the bird's-eye view image generating unit 44 outputs the generated bird's-eye view image 100 to the display controller 48. The bird's-eye view image generating unit 44 includes a viewpoint conversion unit 441, a clipping unit 442, and a synthesizing unit 443.

The viewpoint conversion unit 441 performs a viewpoint conversion with respect to the surrounding video data obtained by the video data obtaining unit 41 in such a way that the vehicle V1 is viewed down from above. More specifically, based on the surrounding video data captured by the front camera 11, the rear camera 12, the left-side camera 13, and the right-side camera 14, the viewpoint conversion unit 441 generates a viewpoint-converted video. Regarding the method for the viewpoint conversion, any known method can be implemented without restriction. The viewpoint conversion unit 441 outputs the viewpoint-converted surrounding video data to the clipping unit 442.

The clipping unit 442 performs a clipping operation for clipping a predetermined range of video from the viewpoint-converted surrounding video data. The clipping range to be set is registered and stored in advance. Then, the clipping unit 442 outputs the video data of the clipped video to the synthesizing unit 443.

The synthesizing unit 443 performs a synthesizing operation for synthesizing the clipped video data. Then, the synthesizing unit 443 generates the bird's-eye view image 100 in which a vehicle icon 110 is presented in the synthesized video.

Figure 4:
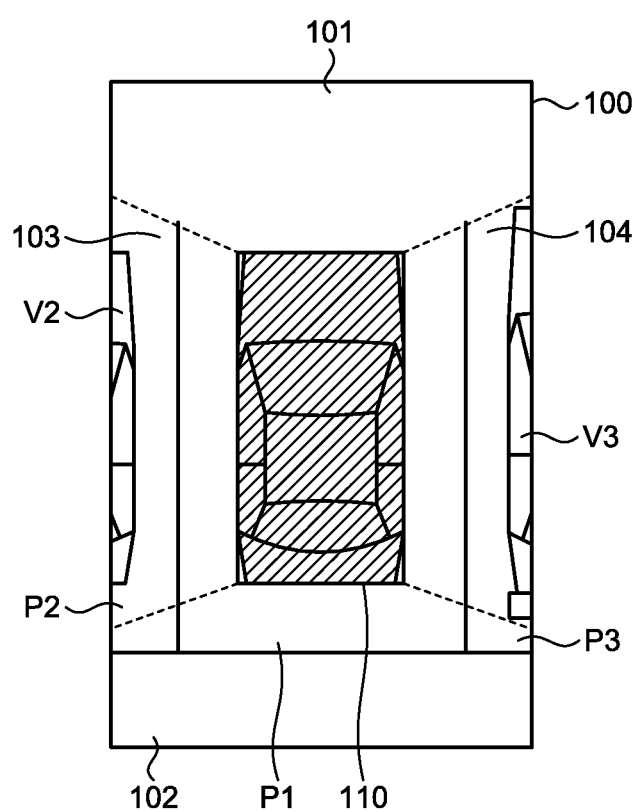
FIG. 4 is a diagram illustrating an example of a bird's-eye view image generated in a display control device of the display control system according to the first embodiment.

The explanation about the bird's-eye view image 100 is given below with reference to FIG. 4. FIG. 4 is a diagram illustrating an example of the bird's-eye view image generated in the display control device of the display control system according to the first embodiment. In the bird's-eye view image 100, the range of about 2 m away from the vehicle V1 is displayed. The display range of the bird's-eye view image 100 includes the adjacent vehicle V2 present in the parking slot P2 and includes the adjacent vehicle V3 present in the parking slot P3. The bird's-eye view image 100 includes an front video 101, a rear video 102, a left-side video 103, a right-side video 104, and a vehicle icon 110 that is positioned in the middle portion of the area enclosed by the front video 101, the rear video 102, the left-side video 103, and the right-side video 104. The vehicle icon 110 indicates the position and the orientation of the vehicle V1. The vehicle icon 110 is positioned in the middle portion with its longitudinal direction parallel to a longitudinal direction of the bird's-eye view image 100.

At the time of the entry into the parking slot, the display controller 48 displays the bird's-eye view image 100 which is generated by the bird's-eye view image generating unit 44 in the display panel 31. Moreover, when the determining unit 43 determines that the count of the adjustment of the vehicle orientation is equal to or greater than the threshold value at the time of the exit of the vehicle V1 from the parking slot by being driven forward, then the display controller 48 displays the bird's-eye view image 100 which is generated by the bird's-eye view image generating unit 44 in the display panel 31. Furthermore, in the first embodiment, when the determining unit 43 determines that the count of the turning back of the steering until the vehicle V1 is parked is equal to or greater than the predetermined threshold value, then the display controller 48 displays the bird's-eye view image 100 in the display panel 31.

The storage 49 is used to temporarily store data that is used in the display control device 40. Examples of the storage 49 include a semiconductor memory device such as a RAM (Random Access Memory), a ROM (Read Only Memory), or a flash memory, and a memory device such as a hard disk and an optical disk. Alternatively, the storage 49 can be an external memory device that is wirelessly connected via a communication device (not illustrated).

Figure 5:
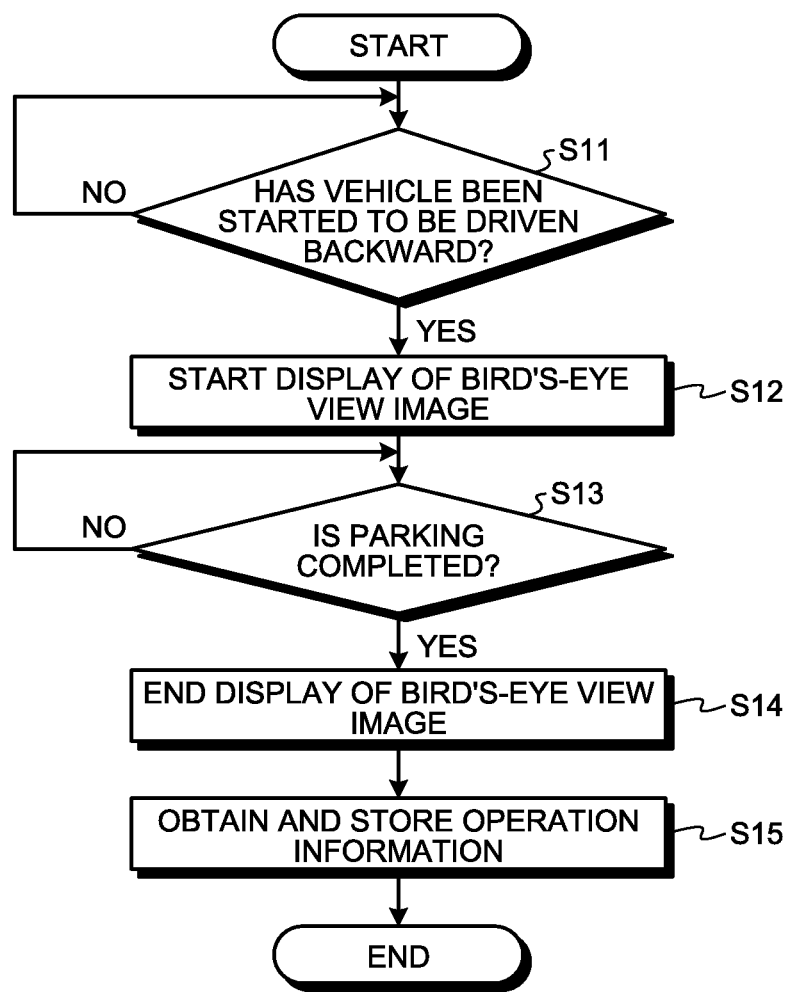
FIG. 5 is a flowchart for explaining an exemplary flow of processes in the display control device of the display control system according to the first embodiment.
Figure 6:
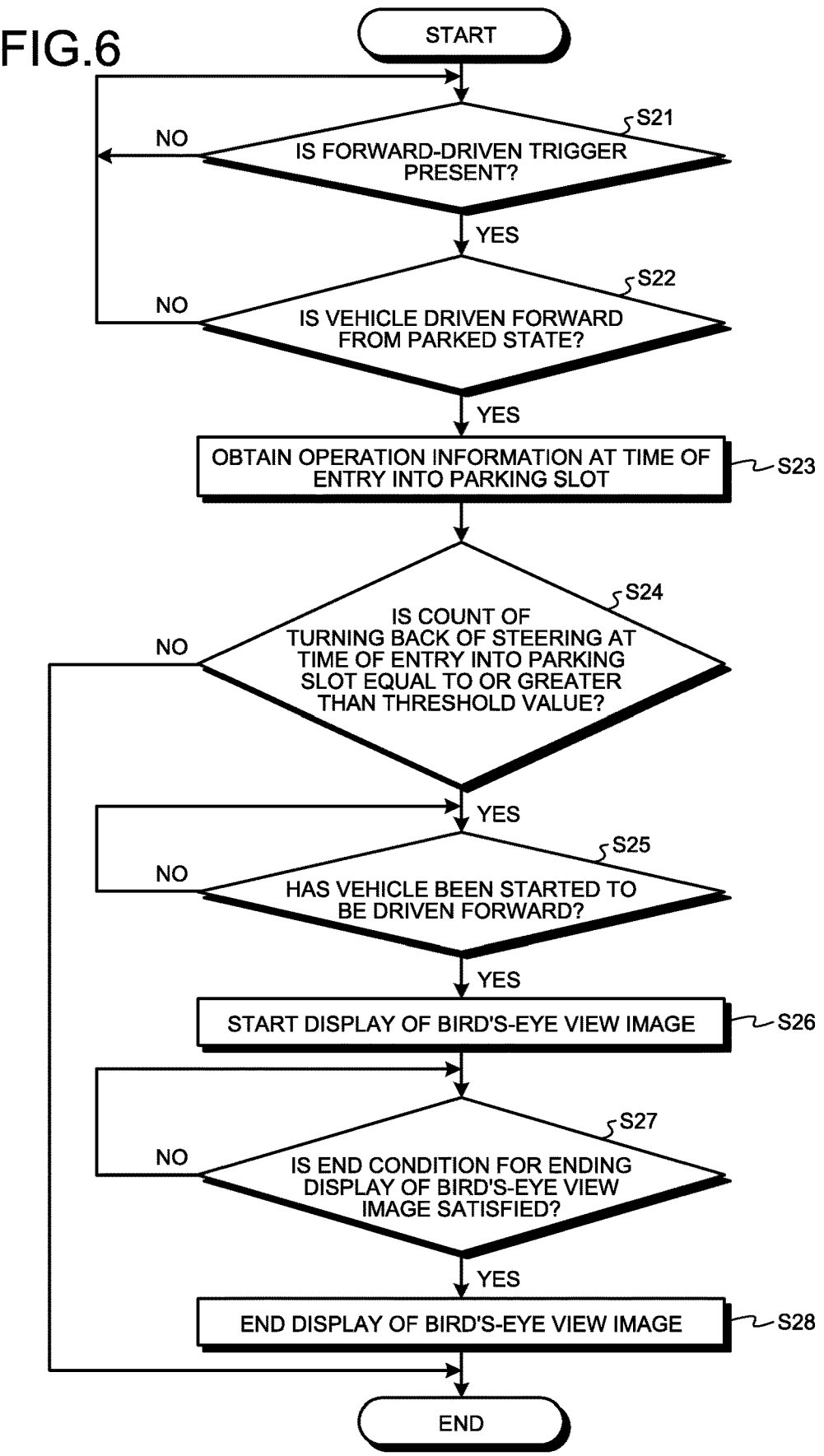
FIG. 6 is a flowchart for explaining another exemplary flow of processes in the display control device of the display control system according to the first embodiment.

Explained below with reference to FIGS. 5 and 6 is a flow of processes in the display control device 40 of the display control system 1. FIG. 5 is a flowchart for explaining an exemplary flow of processes in the display control device of the display control system according to the first embodiment. FIG. 6 is a flowchart for explaining another exemplary flow of processes in the display control device of the display control system according to the first embodiment.

When the display control system 1 is activated, the display control device 40 obtains the video data using the video data obtaining unit 41. Moreover, the display control device 40 obtains the vehicle information using the vehicle information obtaining unit 42.

Firstly, the explanation is given about a flow of processes performed at the time of the entry into the parking slot.

The display control device 40 determines whether or not the vehicle has been started to be driven backward (Step S11). Based on the vehicle information obtained by the vehicle information obtaining unit 42, the display control device 40 determines the presence or absence of a backward-driven trigger. For example, the backward-driven trigger is detected when the gearshift level is set to "reverse" or when the travelling direction of the vehicle v1 is in a backward direction. When it is determined that the vehicle has not been started to be driven backward (No at Step S11), then the display control device 40 again performs the process at Step S11. On the other hand, when it is determined that the vehicle has been started to be driven backward (Yes at Step S11), then the system control proceeds to Step S12.

When it is determined at Step S11 that the vehicle has been started to be driven backward (Yes at Step S11), the display control device 40 starts the display of the bird's-eye view image (Step S12). More specifically, the display control device 40 generates the bird's-eye view image 100 using the bird's-eye view image generating unit 44, and displays the bird's-eye view image 100 in the display panel 31 using the display controller 48. Then, the system control proceeds to Step S13.

The display control device 40 determines whether or not the parking is completed (Step S13). More specifically, based on the vehicle information obtained by the vehicle information obtaining unit 42, the display control device 40 determines that the parking is completed when, for example, the gearshift lever is set to "parking" or "neutral", when the velocity of the vehicle is kept to be zero for a period of five seconds or more, when the engine has stopped, or when the parking brake or the foot brake is applied. When it is determined that the parking is completed, then the display control device 40 determines to end the display of the bird's-eye view image (Yes at Step S13), and the system control proceeds to Step S14. However, when it is determined that the parking is not completed (No at Step S13), then the display control device 40 again performs the process at Step S13.

When it is determined that the parking is completed (Yes at Step S13), the display control device 40 ends the display of the bird's-eye view image (Step S14). Then, the system control proceeds to Step S15.

The display control device 40 obtains the operation information such as the vehicle information using the vehicle information obtaining unit 42 and stores the operation information in the storage 49 (Step S15). Then, the display control device 40 ends the processes.

Given below is the explanation of the flow of processes performed at the time of the exit of the vehicle from the parking slot.

The display control device 40 determines the presence or absence of a forward-driven trigger (Step S21). Based on the vehicle information obtained by the vehicle information obtaining unit 42, the display control device 40 determines the presence or absence of the forward-driven trigger. For example, the forward-driven trigger is detected when the engine is started, when the gearshift lever is set to "drive", or when the parking brake or the foot brake is released. When it is determined that the forward-driven trigger is absent (No at Step S21), then the display control device 40 again performs the process at Step S21. On the other hand, when it is determined that the forward-driven trigger is present (Yes at Step S21), then the system control proceeds to Step S22.

When it is determined at Step S21 that the forward-driven trigger is present (Yes at Step S21), then the display control device 40 determines whether or not the vehicle is driven forward from the parked state (Step S22). More particularly, based on the vehicle information obtained by the vehicle information obtaining unit 42, when the state just before detecting of the forward-driven trigger is determined to indicate that, for example, either the gearshift lever was set to "parking" or "neutral", the velocity of the vehicle has been kept to be zero for a period of five seconds or more, the engine was stopped, or the parking brake or the foot brake was applied, then the display control device 40 determines that the vehicle is driven forward from the parked state. Alternatively, when first-type obstacle information is stored in the storage 49, then the display control device 40 can determine that the vehicle is driven forward from the parked state. When it is determined that the vehicle is not driven forward from the parked state (No at Step S22), then the display control device 40 again performs the process at Step S21. On the other hand, when it is determined that the vehicle is driven forward from the parked state (Yes at Step S22), then the system control proceeds to Step S23.

The display control device 40 obtains the operation information at the time of the entry into the parking slot (Step S23). More specifically, based on the vehicle information stored in the storage 49 at the time of the entry into the parking slot, the display control device 40 obtains the operation information of the vehicle V1 within the parking operation range. Then, the system control proceeds to Step S24.

The display control device 40 determines whether or not the count of the turning back of the steering at the time of the entry into the parking slot is equal to or greater than the threshold value at the time of the entry into the parking slot (Step S24). When the determination result obtained by the determining unit 43 indicates that the count of the turning back of the steering at the time of the entry into the parking slot is not equal to or greater than the threshold value (No at Step S24), then the display control device 40 ends the processes. In that case, the bird's-eye view image 100 is not displayed. On the other hand, when the determination result obtained by the determining unit 43 indicates that the count of the turning back of the steering at the time of the parking is equal to or greater than the threshold value (Yes at Step S24), then the system control proceeds to Step S25.

The display control device 40 determines whether or not the vehicle has been started to be driven forward (Step S25). Based on the obtained operation information, for example, when it is detected that the velocity is equal to or greater than zero or that the vehicle V1 is driven in a front direction, the display control device 40 determines that he vehicle has been started to be driven forward. When it is determined that he vehicle has not been started to be driven forward (No at Step S25), then the display control device 40 again performs the process at Step S25. When it is determined that the vehicle has been started to be driven forward (Yes at Step S25), the system control proceeds to Step S26.

When it is determined at Step S25 that he vehicle has been started to be driven forward (Yes at Step S25), then the display control device 40 starts the display of the bird's-eye view image (Step S26). More specifically, the display control device 40 generates the bird's-eye view image 100 using the bird's-eye view image generating unit 44, and displays the bird's-eye view image 100 in the display panel 31 using the display controller 48. Then, the system control proceeds to Step S27.

As far as a timing of displaying the bird's-eye view image 100 in the display panel 31 is concerned, Step S26 is given only as an example. Alternatively, the bird's-eye view image 100 can be displayed at an arbitrary timing at which it is appropriate to check the surrounding situation at the time of the exit from the parking slot, such as when the engine of the vehicle V1 is started or when the gearshift lever is set to "drive".

The display control device 40 determines whether or not an end condition for ending the display of the bird's-eye view image is satisfied (Step S27). More specifically, the display control device 40 determines that the end condition for ending the display of the bird's-eye view image is satisfied, for example, when it is detected that the vehicle has travelled for a predetermined distance or more from a position at which the vehicle has been started to be driven forward, or when it is detected that the velocity has become equal to or greater than a predetermined velocity, based on the obtained operation information. Specific examples include a case in which the vehicle V1 has travelled for a distance set in advance from the position at which the vehicle has been started to be driven forward, or a case in which the vehicle V1 has travelled for a distance equal to or greater than 5.5 m based on a total length of the vehicle V1. Moreover, specific examples include a case in which the travelling velocity becomes equal to or greater than 5 km/h, for example. When it is determined that the end condition for ending the display of the bird's-eye view image is satisfied, then the display control device 40 determines to end the display of the bird's-eye view image (Yes at Step S27), and the system control proceeds to Step S28. On the other hand, when it is determined that the end condition for ending the display of the bird's-eye view image is not satisfied, then the display control device 40 determines not to end the display of the bird's-eye view image (No at Step S27), and again performs the process at Step S27.

When it is determined at Step S27 that the end condition for ending the display of the bird's-eye view image is satisfied (Yes at Step S27), then the display control device 40 ends the display of the bird's-eye view image (Step S28). Subsequently, the display control device 40 ends the processes.

As described above, in the first embodiment, when the determining unit 43 determines that the count of the turning back of the steering at the time of the entry into the parking slot is equal to or greater than the threshold value, the bird's-eye view image 100 is displayed in the display panel 31. In this way, in the first embodiment, based on the count of the turning back of the steering at the time of the entry into the parking slot, the bird's-eye view image 100 can be appropriately displayed at the time of the exit from the parking slot. As a result, in a case in which the count of the turning back of the steering at the time of the entry into the parking slot has become large, a lot of time and effort is required in the parking operation, and the parking operation was not easy, the driver can appropriately check, at the time of the exit from the parking slot, the surrounding of the vehicle V1 by looking at the bird's-eye view image 100 in addition to performing visual confirmation and looking into the mirror.

In the first embodiment, according to the count of the turning back of the steering at the time of the entry into the parking slot, the bird's-eye view image 100 is displayed only when it is required at the time of the exit of the vehicle from the parking slot. In this way, in the first embodiment, a situation in which the bird's-eye view image 100 is displayed even if it is not required can be prevented from occurring, and a situation in which the bird's-eye view image 100 is displayed when the route in the navigation system is to be checked can be prevented from occurring.

Second Embodiment

Figure 7:
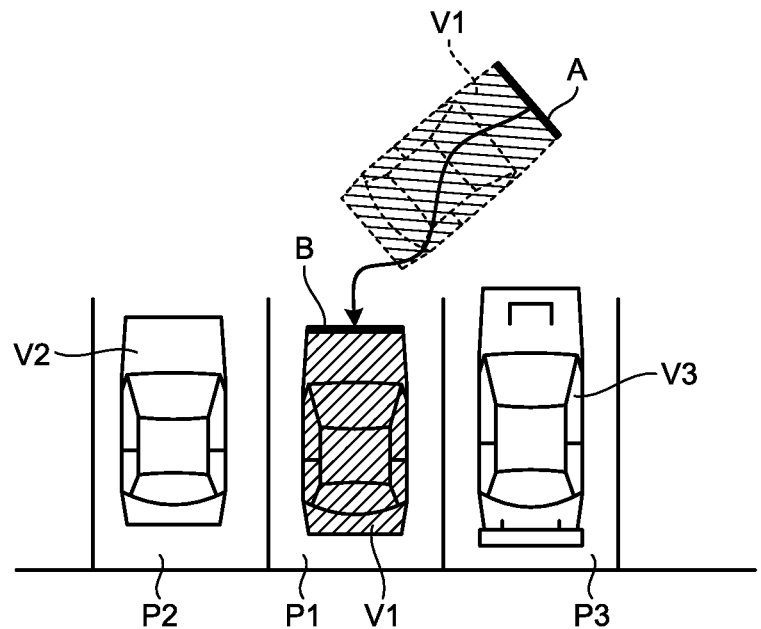
FIG. 7 is a diagram for explaining the parking slots, and illustrates the state of the vehicle at the time of the entry therein.
Figure 8:
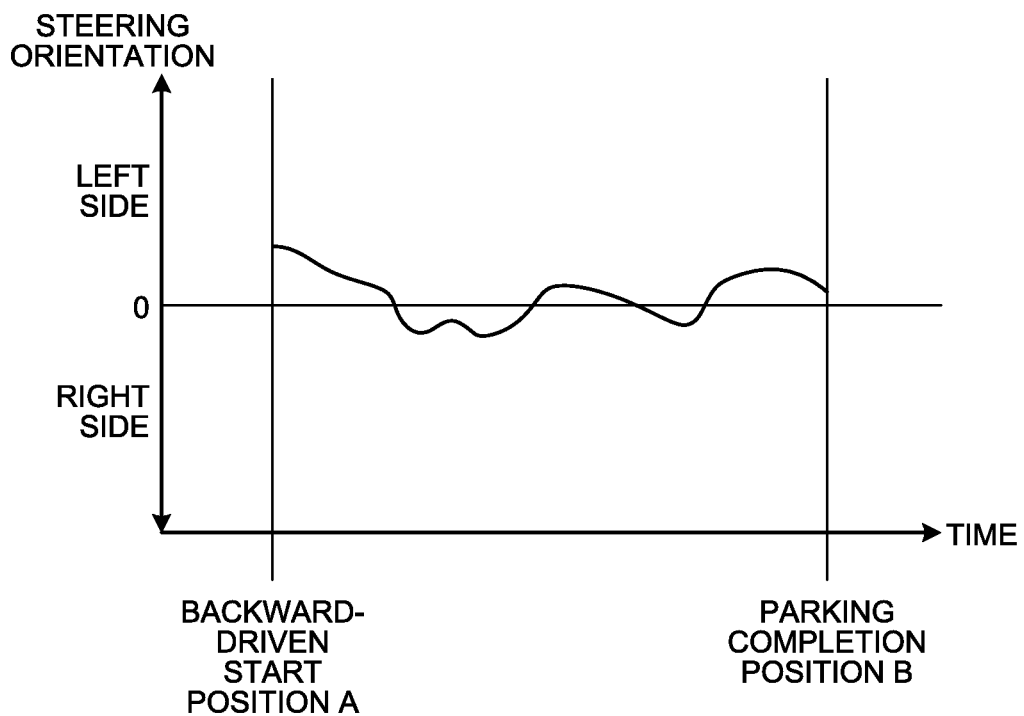
FIG. 8 is a diagram for explaining an example of a steering operation performed at the time of the entry into the parking slot.
Figure 9:
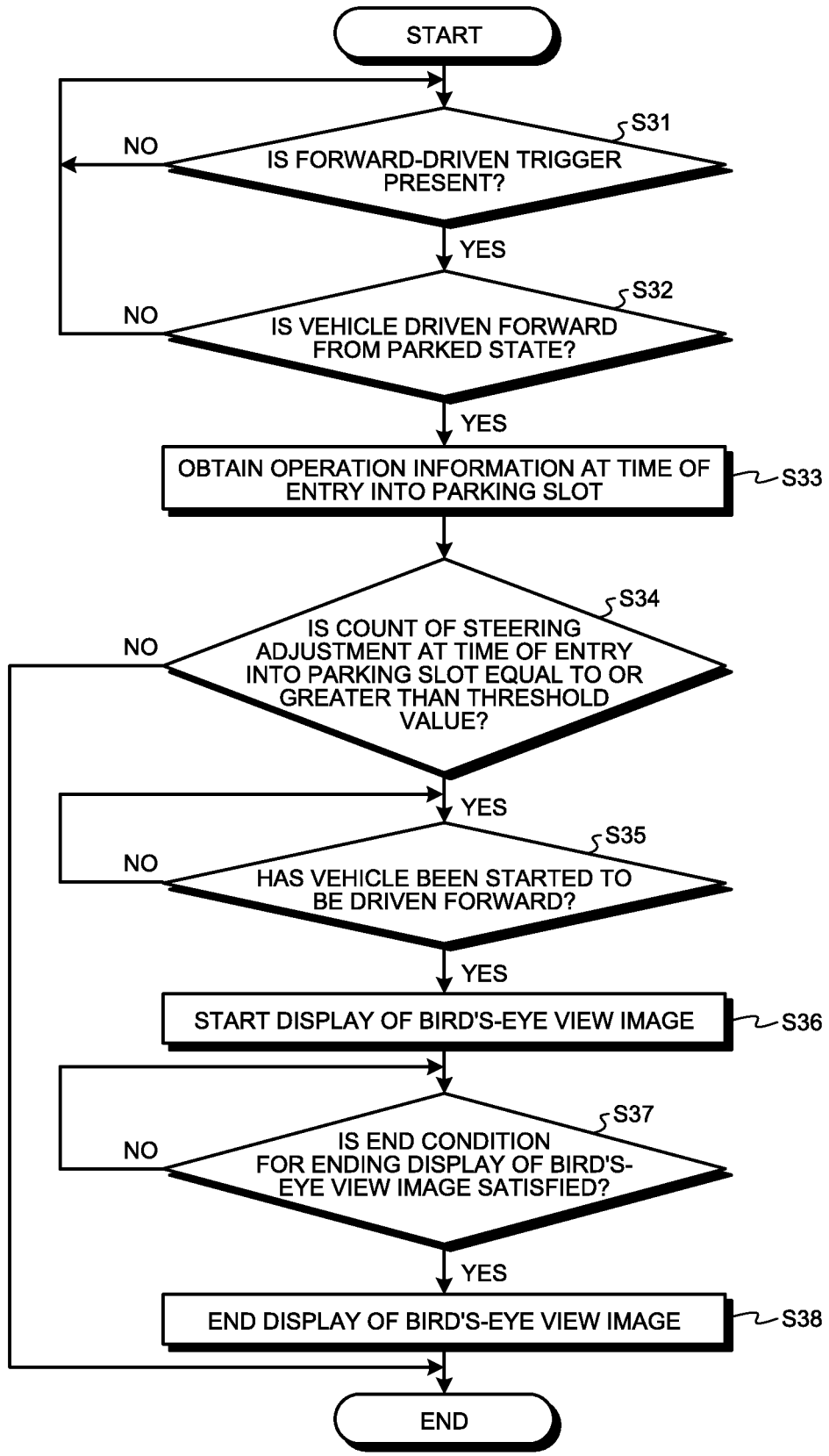
FIG. 9 is a flowchart for explaining an exemplary flow of processes in the display control device of the display control system according to a second embodiment.

Explained below with reference to FIGS. 7 to 9 is the display control system 1 according to a second embodiment. FIG. 7 is a diagram for explaining the parking slots, and illustrates the state at the time of the entry therein. FIG. 8 is a diagram for explaining an example of the steering operation performed at the time of the entry into the parking slot. FIG. 9 is a flowchart for explaining an exemplary flow of processes performed in the display control device of the display control system according to the second embodiment. Herein, the display control system 1 has an identical fundamental configuration to the display control system 1 according to the first embodiment. In the following explanation, the constituent elements identical to the display control system 1 are referred to by the same reference numerals, and the detailed explanation is not given again. In the display control system 1, the processes by the determining unit 43 are different from those in the first embodiment.

The determining unit 43 determines, based on the operation information, that a count of a steering adjustment until the vehicle V1 is parked is equal to or greater than a predetermined threshold value.

The explanation about the steering adjustment is given below with reference to FIGS. 7 and 8. In the steering adjustment, in order to adjust the orientation of the vehicle V1, the steering wheel is operated to the left-hand side and the right-hand side when the vehicle V1 is driven backward from the backward-driven start position A to the parking completion position B as illustrated in FIG. 7. Every time when an orientation of the steering wheel is changed, the count of the steering adjustment is incremented by one. For example, when the steering wheel is turned to the left-hand side or to the right-hand side for the number of times equal to or greater than a threshold value, the count of the steering adjustment can be counted as one count. For example, when the count of the steering adjustment is equal to seven, a relationship between the steering orientation and time from the backward-driven start position A to the parking completion position B is as illustrated in FIG. 8.

The threshold value can be calculated by, for example, multiplying a predetermined coefficient to the standard count of the steering adjustment obtained at the time of the entry into the parking slot regardless of the vehicle and the parking slot. For example, the predetermined coefficient can be set to 1.5, and the threshold value can be set to be 1.5 times the standard count of the steering adjustment at the time of the entry into the parking slot.

For example, an average value of the counts of the steering adjustment can be calculated based on a history of the operation information obtained at the time of the entry of the vehicle V1 into the parking slot, and the threshold value can be calculated by multiplying a predetermined coefficient to the average value. Alternatively, the average value of the counts of the steering adjustment at the time of the entry into the parking slot for each driver can be calculated, and the threshold value can be counted by multiplying a predetermined coefficient to the average value.

For example, the average value of the counts of the steering adjustment can be calculated based on the history of the operation information at the time of the entry of each unspecified vehicle in the target parking slot, and the threshold value can be calculated by multiplying a predetermined coefficient to the average value. For the parking with multiple parking slots, the average value of the counts of the steering adjustment of unspecified vehicles in the whole parking can be calculated without distinguishing the parking slots, and the threshold value can be calculated by multiplying a predetermined coefficient to the average value.

When the determining unit 43 determines that the count of the steering adjustment until the vehicle V1 is parked is equal to or greater than the predetermined threshold value, the bird's-eye view image generating unit 44 generates the bird's-eye view image 100.

When the determining unit 43 determines that the count of the steering adjustment until the vehicle V1 is parked is equal to or greater than the threshold value, the display controller 48 displays the bird's-eye view image 100 in the display panel 31.

Explained below with reference to FIG. 9 is a flow of processes in the display control device 40 of the display control system 1 at the time of the exit of the vehicle from the parking slot. In the flowchart illustrated in FIG. 9, the processes from Step S31 to Step S33 are identical to the processes from Step S21 to Step S23 illustrated in the flowchart in FIG. 6, and the processes from Step S35 to Step S38 are identical to the processes from Step S25 to Step S28 illustrated in the flowchart in FIG. 6.

The display control device 40 determines whether or not the count of the steering adjustment at the time of the entry into the parking slot is equal to or greater than the threshold value (Step S34). When the determination result by the determining unit 43 indicates that the count of the steering adjustment at the time of the entry into the parking slot is not equal to or greater than the threshold value (No at Step S34), then the display control device 40 ends the processes. In that case, the bird's-eye view image 100 is not displayed. On the other hand, when the determination result by the determining unit 43 indicates that the count of the steering adjustment at the time of the entry into the parking slot is equal to or greater than the threshold value (Yes at Step S34), then the system control proceeds to Step S35.

As described above, according to the second embodiment, when the determining unit 43 determines that the count of the steering adjustment at the time of the entry into the parking slot is equal to or greater than the threshold value, the bird's-eye view image 100 is displayed in the display panel 31. In this way, in the second embodiment, according to the count of the steering adjustment at the time of the entry into the parking slot, the bird's-eye view image 100 can be appropriately displayed at the time of the exit of the vehicle from the parking slot. As a result, in the case in which the count of the steering adjustment at the time of the entry into the parking slot had become large, a lot of time and effort is required in the parking operation, and the parking operation was not easy, the driver can appropriately check, at the time of the exit from the parking slot, the surrounding of the vehicle V1 by looking at the bird's-eye view image 100 in addition to performing visual confirmation and looking into the mirror.

Third Embodiment

Figure 10:
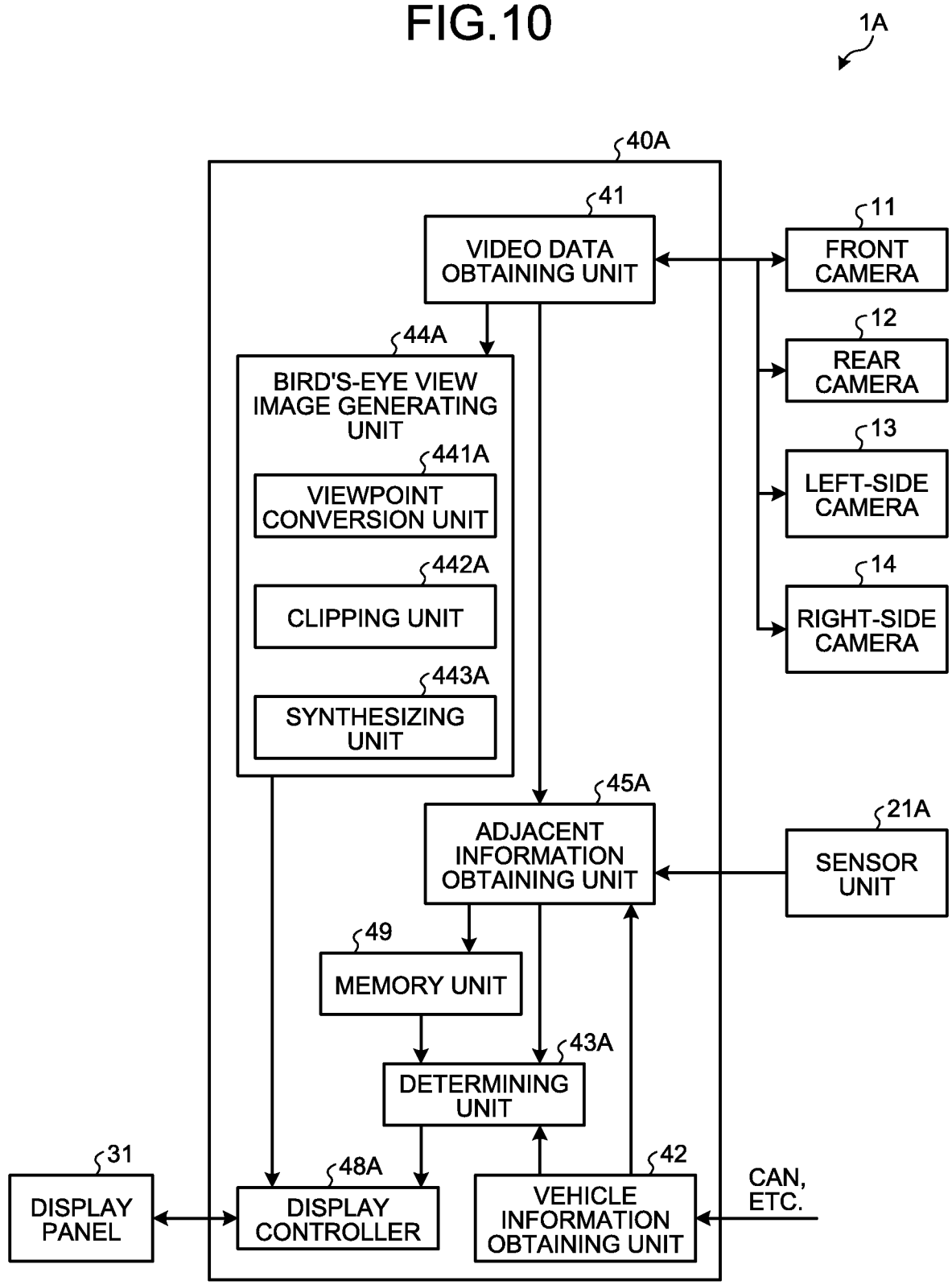
FIG. 10 is a block diagram illustrating an exemplary configuration of a display control system according to a third embodiment.
Figure 11:
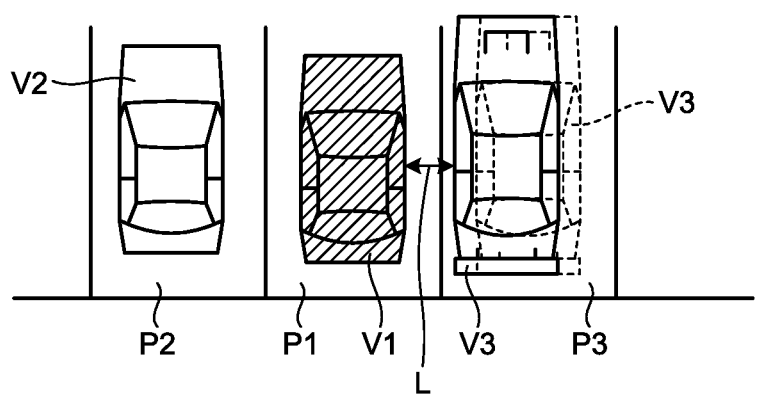
FIG. 11 is a diagram for explaining the parking slots, and illustrates the state of the vehicle at a time of entry therein and at a time of exit therefrom.
Figure 12:
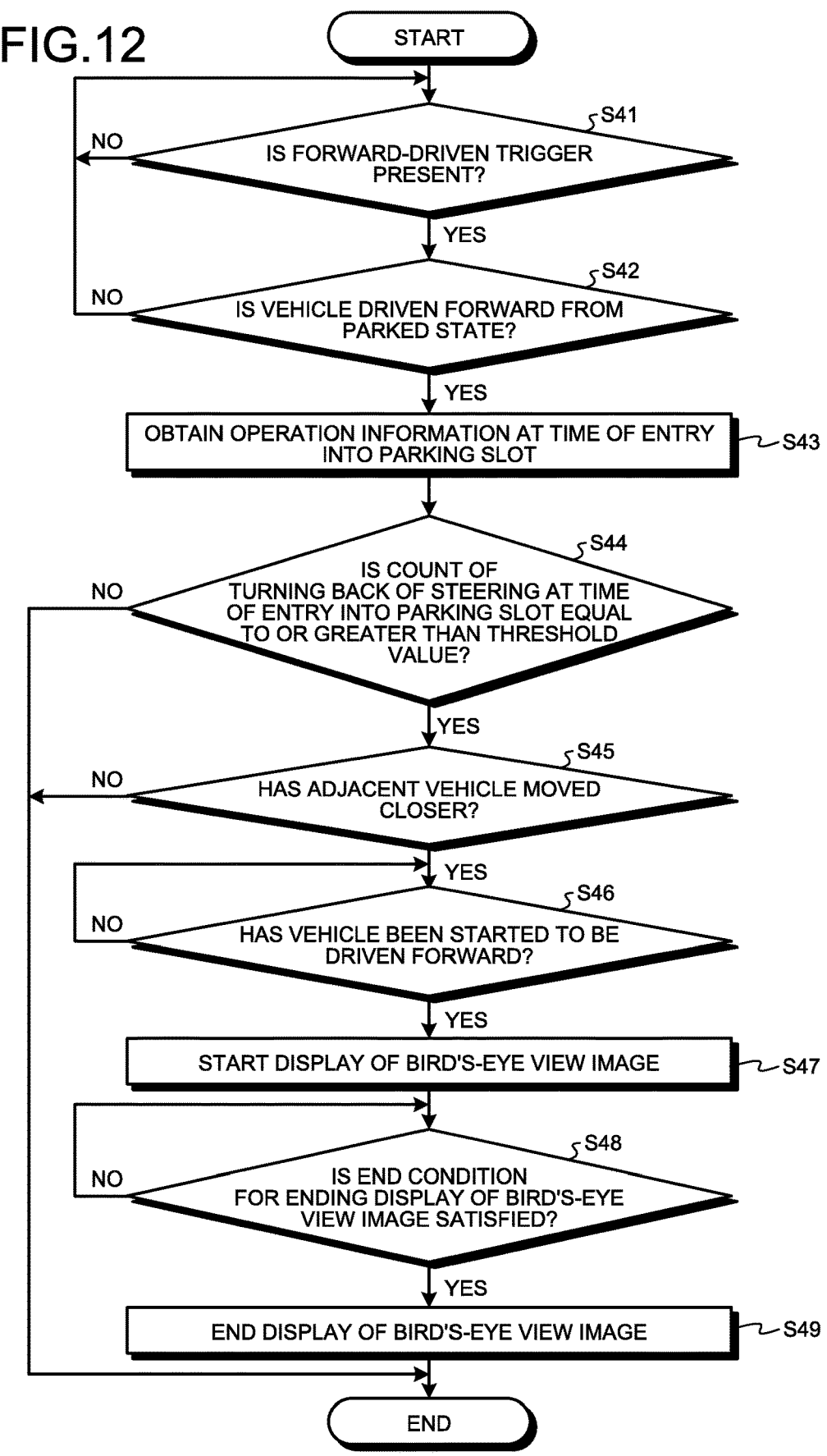
FIG. 12 is a flowchart for explaining an exemplary flow of processes in a display control device of the display control system according to the third embodiment.

Explained below with reference to FIGS. 10 to 12 is a display control system 1A according to a third embodiment. FIG. 10 is a block diagram illustrating an exemplary configuration of the display control system according to the third embodiment. FIG. 11 is a diagram for explaining the parking slots, and illustrates a state of entry into the parking slot and a state of exit from the parking slot. FIG. 12 is a flowchart for explaining an exemplary flow of processes in the display control device of the display control system according to the third embodiment. The display control system 1A has an identical fundamental configuration to the display control system 1 according to the first embodiment. The display control system 1A differs from the first embodiment in that an adjacent information obtaining unit 45A that obtains adjacent information from a sensor unit 21A is included.

The display control system 1A includes the sensor unit 21A.

The sensor unit 21A includes multiple sensors installed around the vehicle V1. The sensor unit 21A is capable of detecting obstacles present in the vicinity of the vehicle V1. In the third embodiment, the sensor unit 21A detects, as the obstacles present in the vicinity of the vehicle V1, the adjacent vehicles present in the parking slots P2 and P3 that are adjacent to the parking slot P1 in which the vehicle V1 is to be parked. In the third embodiment, the sensor unit 21A includes a front middle sensor, a front left-side sensor, a front right-side sensor, a rear middle sensor, a rear left-side sensor, a rear right-side sensor, a left-side sensor, and a right-side sensor. Since all sensors are configured in an identical manner, the following explanation is given only about the front right-side sensor, and the explanation about the other sensors is not given.

The front right-side sensor is installed on a front right-side of the vehicle V1, and detects the obstacles present in the front right-side of the vehicle V1. In the third embodiment, the front right-side sensor detects the adjacent vehicle present in the parking slot P3. The front right-side sensor is, for example, an infrared sensor, an ultrasonic sensor, or a millimeter wave radar, or a sensor configured by combining such sensors. The front right-side sensor detects the adjacent vehicle present away from the vehicle V1 by, for example, about 5 m. In a vertical view, the front right-side sensor detects the adjacent vehicle in, for example, a range of about 400 around a center of the sensor. The detection range of the front right-side sensor can be partially overlapping with the detection range of the front middle sensor. The front right-side sensor outputs obstacle information, which represents a detection result indicating the present or absence of the adjacent vehicle, to the adjacent information obtaining unit 45A of the display control device 40A.

As a result of using the sensor unit 21A, the adjacent vehicles present all around the vehicle V1 can be detected. In the third embodiment, according to the detection result obtained by the sensor unit 21A, the adjacent vehicles present in the parking slots P2 and P3 can be detected. More specifically, the parking slot in which the adjacent vehicle is detected is identified based on information, included in the detection result, that which sensor has detected the adjacent vehicle, and a horizontal existence range of the adjacent vehicle detected by the sensor included in the detection result.

In the third embodiment, the adjacent information obtaining unit 45A corresponds to an obstacle information obtaining unit that obtains obstacle information of obstacles present around the vehicle V1. The adjacent information obtaining unit 45A obtains first-type obstacle information at the time of the entry into the parking slot by being driven backward and obtains second-type obstacle information at the time of the exit from the parking slot by being driven forward. More specifically, when the vehicle V1 is driven backward for the entry into the parking slot, the adjacent information obtaining unit 45A obtains the first-type obstacle information from the sensor unit 21A. Then, the adjacent information obtaining unit 45A stores the first-time obstacle information obtained at the time of the entry into the parking slot in the storage 49. When the vehicle V1 is driven forward for the exit from the parking slot, the adjacent information obtaining unit 45A obtains the second-type obstacle information from the sensor unit 21A. The determination about the entry of the vehicle V1 into the parking slot by being driven backward and the determination about the exit of the vehicle V1 from the parking slot by being driven forward is performed based on the gear operation information and engine on/off information of the vehicle V1 obtained from the vehicle information obtaining unit 42. The adjacent information obtaining unit 45A outputs the adjacent vehicle information obtained at the time of the exit from the parking slot to a determining unit 43A.

The first-type obstacle information represents the information about the obstacles present around the vehicle V1 at the time of the entry of the vehicle V1 into the parking slot by being driven backward. In the third embodiment, the first-type obstacle information represents information about the presence or absence of the adjacent vehicles in the parking slots P2 and P3 at the time of the entry of the vehicle V1 into the parking slot by being driven backward.

The second-type obstacle information represents the information about the obstacles present around the vehicle V1 at the time of the exit of the vehicle V1 from the parking slot by being driven forward. In the third embodiment, the second-type obstacle information represents information about the presence or absence of the adjacent vehicles in the parking slots P2 and P3 at the time of the exit of the vehicle V1 from the parking slot by being driven forward.

Explained below with reference to FIG. 11 is a surrounding situation of the vehicle V1 at the time of the entry of the vehicle V1 into the parking slot and at the time of the exit of the vehicle V1 from the parking slot. In FIG. 11, a position of the adjacent vehicle V3 at the time of the entry of the vehicle V1 into the parking slot is illustrated by dashed lines, and the position of the adjacent vehicle V3 at the time of the exit of the vehicle V1 from the parking slot is illustrated by solid lines. At the time of the entry into the parking slot, the adjacent vehicle V2 is present in the parking slot P2, and the adjacent vehicle V3 is present in the parking slot P3. The sensor unit 21A obtains this information, and the adjacent information obtaining unit 45A obtains this information as the first-type obstacle information.

At the time of the exit of the vehicle V1 from the parking slot, the position of the adjacent vehicle V3 in the parking slot P3 has changed more close to the vehicle V1 as compared to the position thereof at the time of the entry of the vehicle V1 into the parking slot. More specifically, a distance L between the adjacent vehicle V3 in the parking slot P3 and a side of the vehicle V1 has become shorter as compared to the distance at the time of the entry of the vehicle V1 into the parking slot. The sensor unit 21A detects this information, and the adjacent information obtaining unit 45A obtains this information as the second-type obstacle information.

Based on the obstacle information obtained by the adjacent information obtaining unit 45A, the determining unit 43A determines whether or not a change of the surrounding obstacles between at the entry into the parking slot and at the exit from the parking slot satisfies a predetermined condition. In the third embodiment, based on the first-type obstacle information and the second-type obstacle information obtained by the adjacent information obtaining unit 45A, the determining unit 43A determines that the change of the surrounding obstacles between at the entry into the parking slot and at the exit from the parking slot satisfies the predetermined condition when there is no change in the surrounding obstacles or when there is a change indicating that at least one surrounding obstacle has moved closer to the vehicle V1. The change indicating that at least one surrounding obstacle has moved closer to the vehicle V1 includes a case in which, although there was no obstacle present at the time of the entry into the parking slot, an obstacle is present at the time of the exit from the parking slot, and a case in which the position of the obstacle at the time of the exit from the parking slot has moved closer to the vehicle V1 as compared to the position of the obstacle at the time of the entry into the parking slot.

When the determining unit 43A determines that the count of the turning back of the steering at the time of the entry into the parking slot is equal to or greater than the threshold value and also determines that the change of the surrounding obstacles between at the entry into the parking slot and at the exit from the parking slot satisfies the predetermined condition, an bird's-eye view image generating unit 44A generates the bird's-eye view image 100.

When the determining unit 43A determines that the count of the turning back of the steering at the time of the entry into the parking slot is equal to or greater than the threshold value and also determines that the change of the surrounding obstacles between at the entry of the vehicle V1 into the parking slot and at the exit of the vehicle V1 from the parking slot satisfies the predetermined condition, a display controller 48A displays the bird's-eye view image 100 in the display panel 31 at the time of the exit of the vehicle V1 from the parking slot.

Explained below with reference to FIG. 12 is a flow of processes in the display control device 40A of the display control system 1A. In the flowchart illustrated in FIG. 12, the processes from Step S41 to Step S44 are identical to the processes from Step S21 to Step S24 illustrated in the flowchart in FIG. 6, and the processes from Step S46 to Step S49 are identical to the processes from Step S25 to Step S28 illustrated in the flowchart in FIG. 6.

The display control device 40A determines whether or not the adjacent vehicle has moved closer (Step S45). When the determination result obtained by the determining unit 43A indicates that the position of the adjacent vehicle at the time of the exit from the parking slot has changed to be closer to the vehicle V1 as compared to the position at the time of the entry into the parking slot (Yes at Step S45), then the system control proceeds to Step S46. On the other hand, when the determination result obtained by the determining unit 43A indicates that the position of the adjacent vehicle at the time of the exit from the parking slot has not changed to be closer to the vehicle V1 as compared to the position at the time of the entry into the parking slot (No at Step S45), then the display control device 40A ends the processes.

As described above, according to the third embodiment, when the determining unit 43A determines that the count of the turning back of the steering at the time of the entry into the parking slot is equal to or greater than the threshold value and also determines that the change of the surrounding obstacles between at the entry into the parking slot and at the exit from the parking slot satisfies the predetermined condition, the bird's-eye view image 100 is displayed in the display panel 31. In this way, in the third embodiment, based on the count of the turning back of the steering at the time of the entry into the parking slot and based on the change of the adjacent vehicles, the bird's-eye view image 100 can be appropriately displayed at the time of the exit of the vehicle V1 from the parking slot. As a result, when the situation at the time of the exit of the vehicle V1 from the parking slot is expected to become difficult, the driver can appropriately check the surrounding of the vehicle V1 by looking at the bird's-eye view image 100 in addition to performing visual confirmation and looking into the mirror.

Fourth Embodiment

Figure 13:
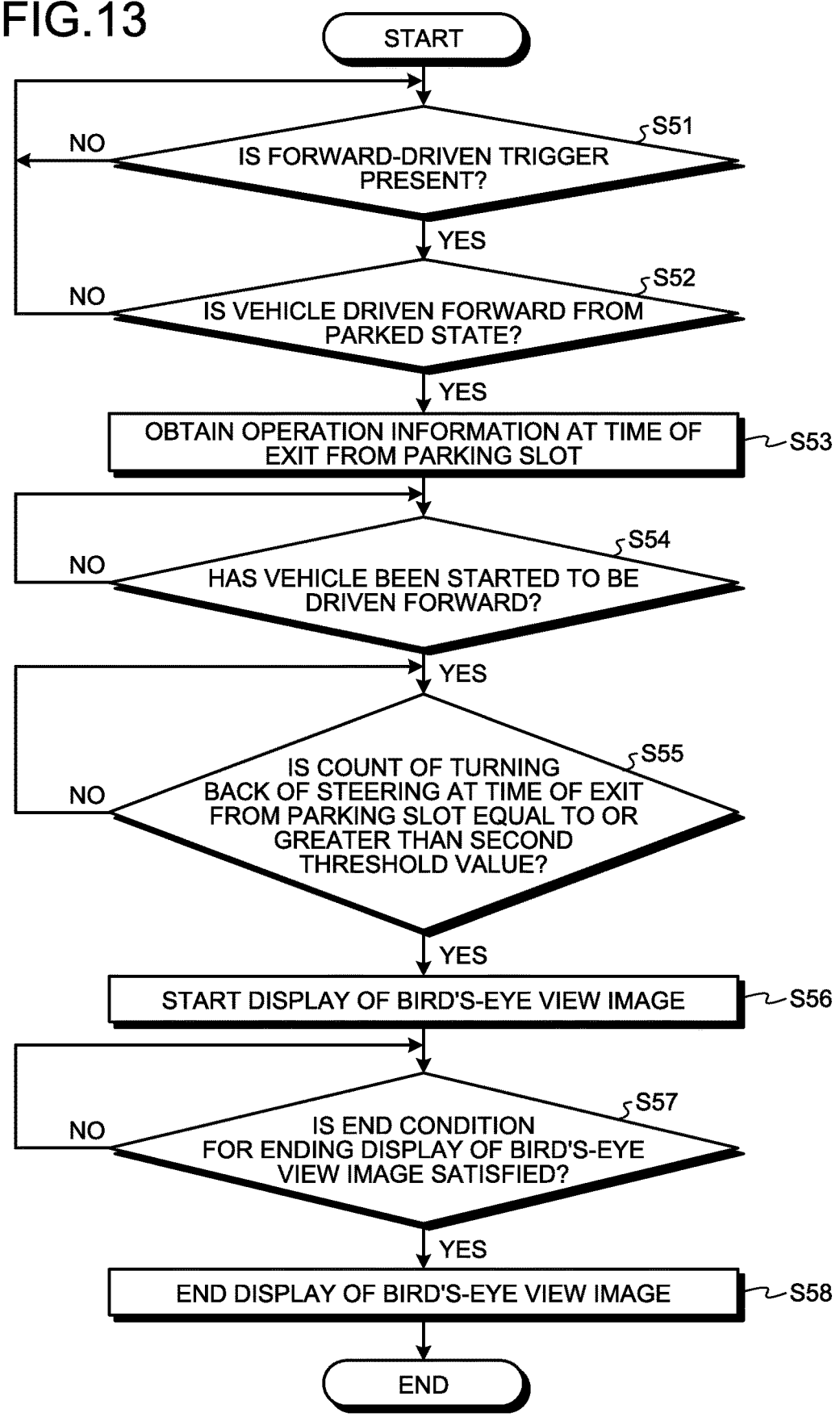
FIG. 13 is a flowchart for explaining an exemplary flow of processes in the display control device of the display control system according to a fourth embodiment.

Explained below with reference to FIG. 13 is the display control system 1 according to a fourth embodiment. FIG. 13 is a flowchart for explaining an exemplary flow of processes in the display control device of the display control system according to the fourth embodiment. Herein, the display control system 1 has an identical fundamental configuration to the display control system 1 according to the first embodiment. In the display control system 1, the processes by the determining unit 43 are different from those in the first embodiment.

Based on the operation information, the determining unit 43 determines that the count of the turning back of the steering of the vehicle V1 from the parked state to a state in which the exit from the parking slot is completed is equal to or greater than a predetermined second threshold value (a predetermined threshold value).

When the determining unit 43 determines that the count of the turning back of the steering of the vehicle V1 from the parked state to the state in which the exit from the parking slot is completed is equal to or greater than the predetermined second threshold value, then the bird's-eye view image generating unit 44 generates the bird's-eye view image 100.

Moreover, when the determining unit 43 determines that the count of the turning back of the steering of the vehicle V1 from the parked state to the state in which the exit from the parking slot is completed is equal to or greater than the predetermined second threshold value, then the display controller 48 displays the bird's-eye view image 100 in the display panel 31.

Explained below with reference to FIG. 13 is a flow of processes in the display control device 40 of the display control system 1 at the time of the exit from the parking slot. In the flowchart illustrated in FIG. 13, the processes at Step S51, Step S52, and Step S56 to Step S58 are identical to the processes at Step S21, Step S22, and Step S26 to Step S28, respectively, illustrated in the flowchart in FIG. 6.

The display control device 40 obtains the operation information at the time of the exit from the parking slot (Step S53). Then, the display control device 40 proceeds to Step S54.

The display control device 40 determines whether or not the vehicle has been started to be driven forward (Step S54). When it is determined by an identical process to the process at Step S25 that the vehicle V1 has not been started to be driven forward (No at Step S54), then the display control device 40 again performs the process at Step S54. On the other hand, when it is determined that he vehicle has been started to be driven forward (Yes at Step S54), then the system control proceeds to Step S55.

The display control device 40 determines whether or not the count of the turning back of the steering at the time of the exit from the parking slot is equal to or greater than the second threshold value (Step S55). When the determination result by the determining unit 43 indicates that the count of the turning back of the steering at the time of the exit from the parking slot is not equal to or greater than the second threshold value (No at Step S55), then the display control device 40 repeatedly performs the operation at Step S55. On the other hand, when the determination result by the determining unit 43 indicates that the count of the turning back of the steering at the time of the exit from the parking slot is equal to or greater than the second threshold value (Yes at Step S55), then the system control proceeds to Step S56.

As described above, according to the fourth embodiment, when the determining unit 43 determines that the count of the turning back of the steering at the time of the exit from the parking slot is equal to or greater than the second threshold value, the bird's-eye view image 100 is displayed in the display panel 31. In this way, in the fourth embodiment, the bird's-eye view image 100 can be appropriately displayed based on the count of the turning back of the steering at the time of the exit from the parking slot. As a result, when the count of the turning back of the steering at the time of the exit from the parking slot becomes large and thus the operation for the exit from the parking slot is expected to become difficult, the driver can appropriately check the surrounding of the vehicle V1 by looking at the bird's-eye view image 100 in addition to performing visual confirmation and looking into the mirror.

Fifth Embodiment

Figure 14:
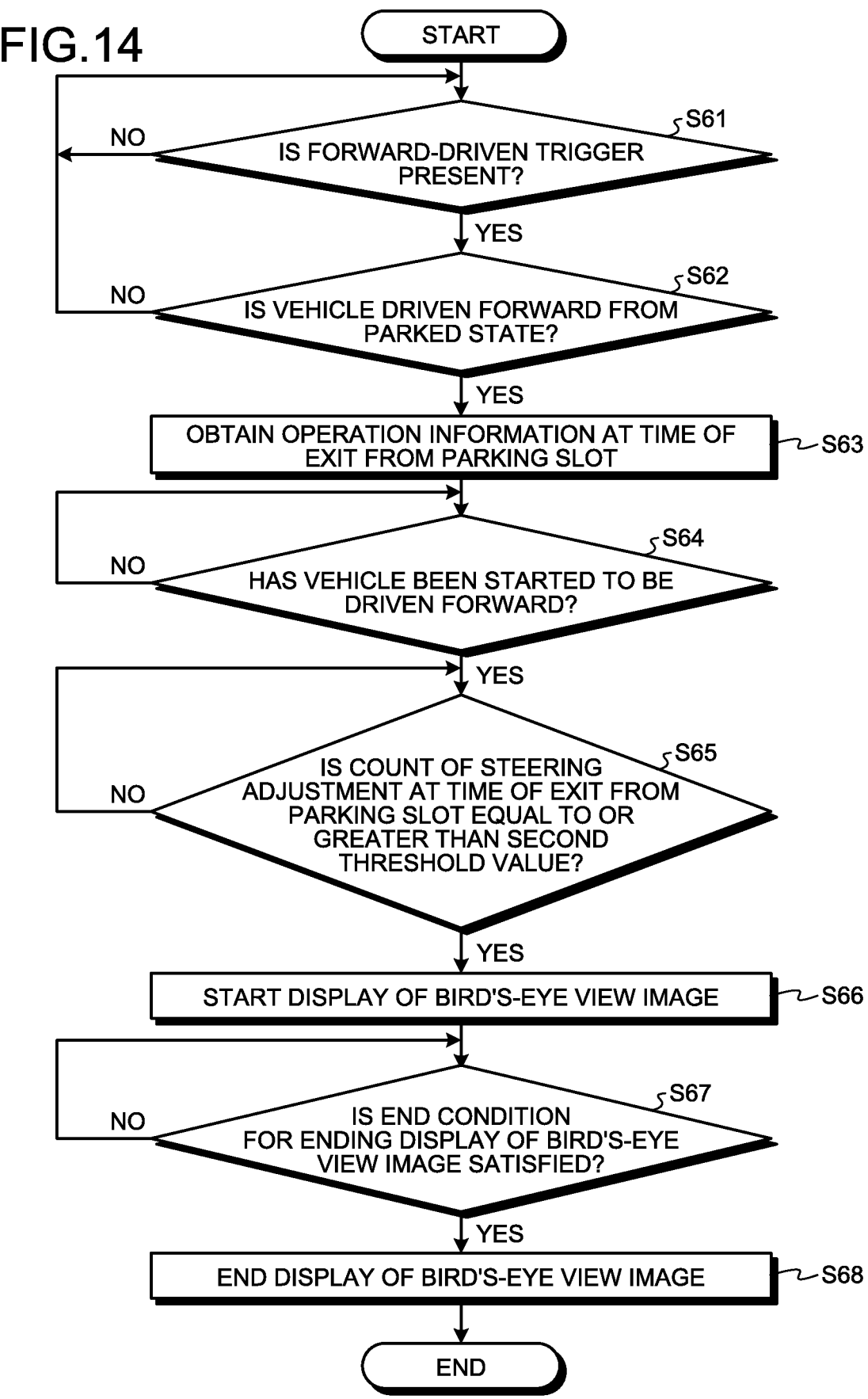
FIG. 14 is a flowchart for explaining an exemplary flow of processes in the display control device of the display control system according to a fifth embodiment.

Explained below with reference to FIG. 14 is the display control system 1 according to a fifth embodiment. FIG. 14 is a flowchart for explaining an exemplary flow of processes in the display control device of the display control system according to the fourth embodiment. The display control system 1 has an identical fundamental configuration to the display control system 1 according to the second embodiment. In the display control system 1, the processes by the determining unit 43 are different from those in the second embodiment.

Based on the operation information, the determining unit 43 determines whether or not the count of the steering adjustment from the parked state of the vehicle V1 to a state in which the exit from the parking slot is completed is equal to or greater than a predetermined second threshold value (a predetermined threshold value).

When the determining unit 43 determines that the count of the steering adjustment from the parked state of the vehicle V1 to the state in which the exit from the parking slot is completed is equal to or greater than the predetermined second threshold value, then the bird's-eye view image generating unit 44 generates the bird's-eye view image 100.

Moreover, when the determining unit 43 determines that the count of the steering adjustment from the parked state of the vehicle V1 to the state in which the exit from the parking slot is completed is equal to or greater than the predetermined second threshold value, then the display controller 48 displays the bird's-eye view image 100 in the display panel 31.

Explained below with reference to FIG. 14 is a flow of processes in the display control device 40 of the display control system 1 at the time of the exit from the parking slot. In the flowchart illustrated in FIG. 14, the processes at Step S61, Step S62, and Step S66 to Step S68 are identical to the processes at Step S31, Step S32, and Step S36 to Step S38, respectively, illustrated in the flowchart in FIG. 9. Moreover, in the flowchart illustrated in FIG. 14, the processes at Steps S63 and S64 are identical to the processes at Steps S53 and S54, respectively, illustrated in the flowchart in FIG. 13.

The display control device 40 determines whether or not the count of the steering adjustment at the time of the exit from the parking slot is equal to or greater than the second threshold value (Step S65). When the determination result by the determining unit 43 indicates that the count of the steering adjustment at the time of the exit from the parking slot is not equal to or greater than the second threshold value (No at Step S65), then the display control device 40 repeatedly performs the process at Step S65. On the other hand, when the determination result by the determining unit 43 indicates that the count of the steering adjustment at the time of the exit from the parking slot is equal to or greater than the second threshold value (Yes at Step S65), then the system control proceeds to Step S66.

As described above, according to the fifth embodiment, when the determining unit 43 determines that the count of the steering adjustment at the time of the exit from the parking slot is equal to or greater than the second threshold value, the bird's-eye view image 100 is displayed in the display panel 31. According to the fifth embodiment, for example, when the steering operation is performed in a direction different from an exit direction at the time of the exit from the parking slot in order to avoid obstacles, the bird's-eye view image 100 can be displayed in the display panel 31. In this way, in the fifth embodiment, the bird's-eye view image 100 can be appropriately displayed according to the count of the steering adjustment at the time of the exit from the parking slot. As a result, when the count of the steering adjustment at the time of the exit from the parking slot becomes large and when the operation for the exit from the parking slot is expected to become difficult, the driver can appropriately check the surrounding of the vehicle V1 by looking at the bird's-eye view image 100 in addition to performing visual confirmation and looking into the mirror.

Sixth Embodiment

Figure 15:
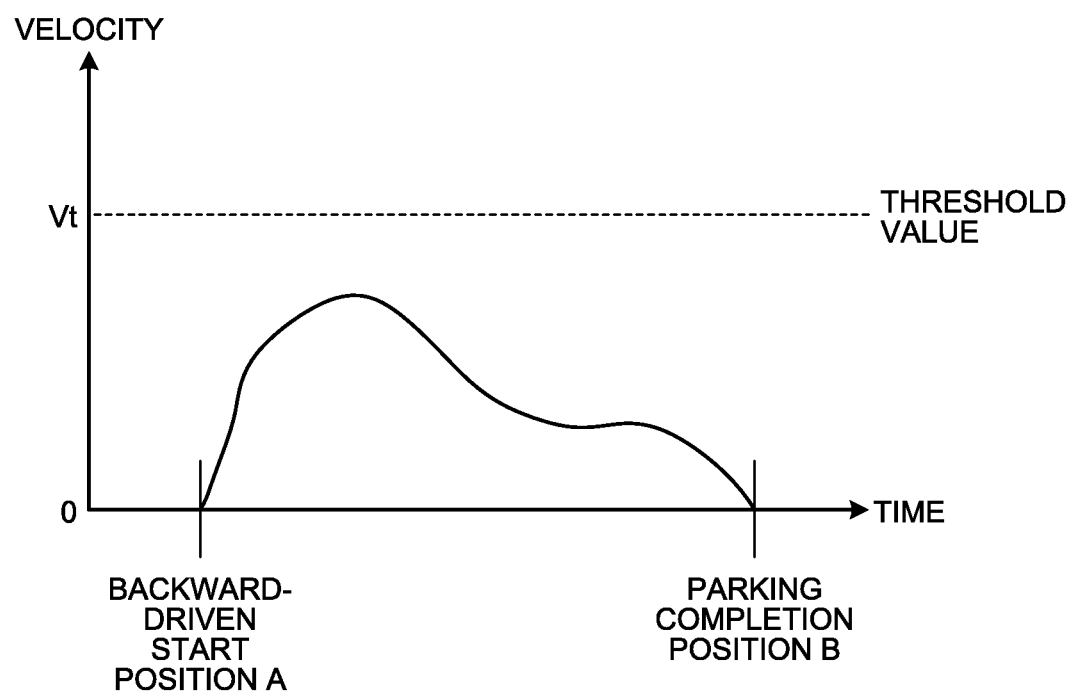
FIG. 15 is a diagram for explaining an example of a change of the velocity of the vehicle at the time of the entry into the parking slot.
Figure 16:
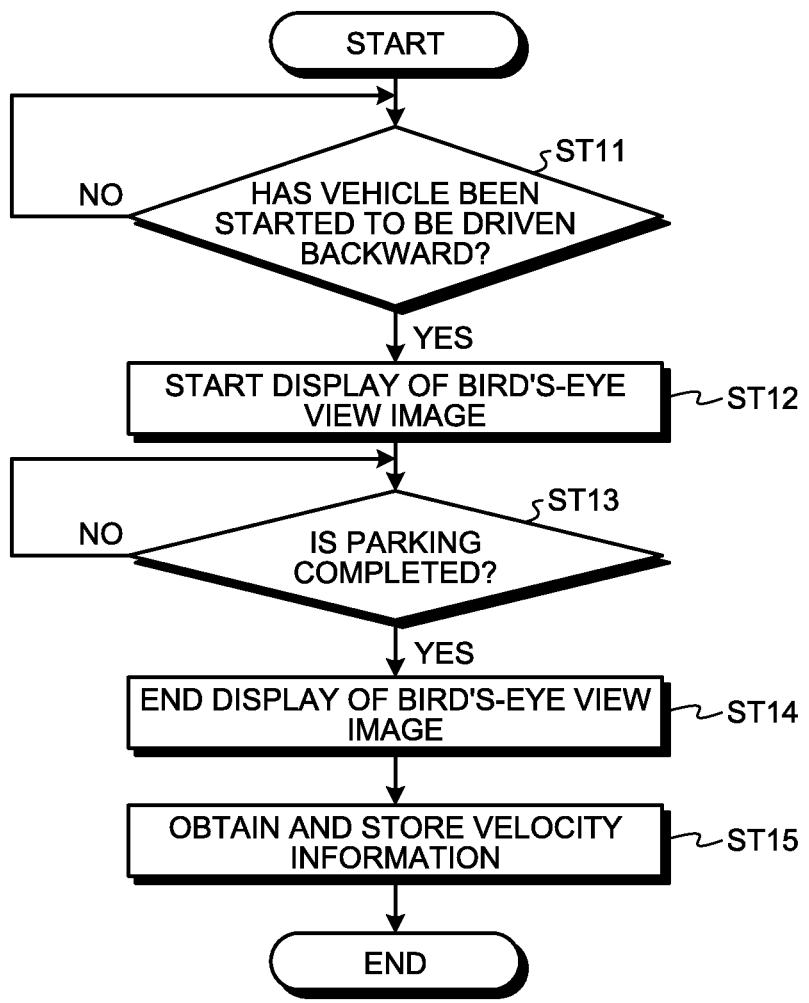
FIG. 16 is a flowchart for explaining an exemplary flow of processes in the display control device of the display control system according to a sixth embodiment.
Figure 17:
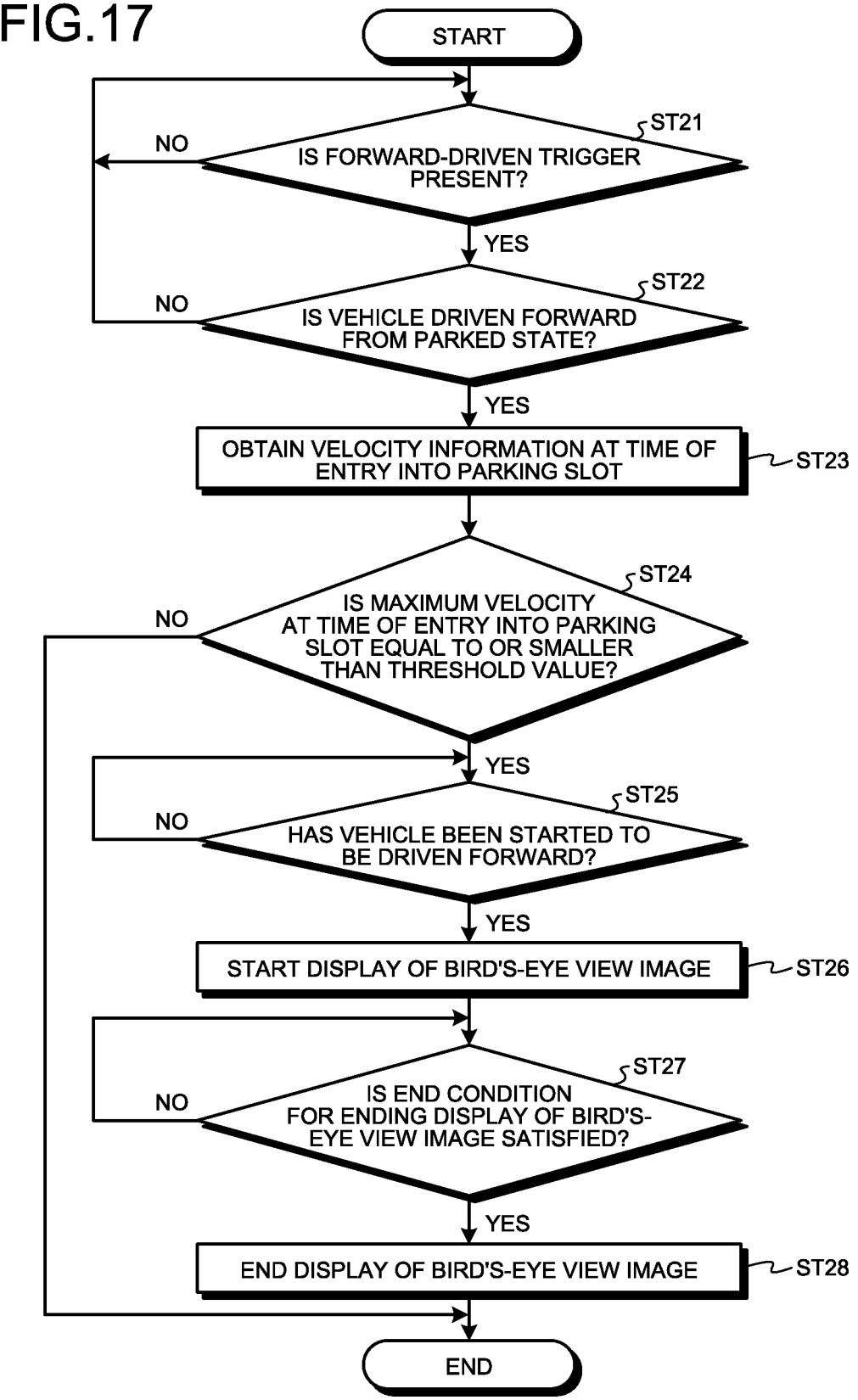
FIG. 17 is a flowchart for explaining another exemplary flow of processes in the display control device of the display control system according to the sixth embodiment.

Explained below with reference to FIGS. 15 to 17 is the display control system 1 according to a sixth embodiment. The display control system 1 appropriately displays the bird's-eye view image 100 according to the velocity of the vehicle within the parking operation range.

The determining unit 43 obtains velocity information of the vehicle at the time of the entry into the parking slot by being driven backward within the parking operation range that includes the parking slot in which the vehicle is to be parked, and determines whether or not the velocity at the time of the entry into the parking slot by being driven backward within the parking operation range is equal to or smaller than a predetermined threshold value Vt (see FIG. 15) that is defined as comparison velocity information. More specifically, based on the vehicle information obtained by the vehicle information obtaining unit 42, the determining unit 43 obtains the velocity information of the vehicle at the time of the entry into the parking slot by being driven backward within the parking operation range that includes the parking slot in which the vehicle is to be parked. Then, based on the obtained velocity information, the determining unit 43 determines whether or not the velocity at the time of the entry into the parking slot by being driven backward within the parking operation range is equal to or smaller than the threshold value Vt.

The average velocity at the time of the entry into the parking slot by being driven backward within the parking operation range, or the threshold value Vt defined based on the maximum velocity is treated as the comparison velocity information. In the sixth embodiment, the threshold value Vt as the comparison velocity information is defined based on the maximum velocity at the time of the entry into the parking slot.

The threshold value Vt can be calculated by, for example, multiplying a predetermined coefficient to a standard maximum velocity at the time of the entry into the parking slot regardless of the vehicle and the parking slot. For example, when the predetermined coefficient is set to 60%, then the threshold value Vt becomes equal to 60% of the standard maximum velocity at the time of the entry into the parking slot. For example, when the range of the maximum velocity at the time of the entry into the parking slot is from equal to or greater than 7 km/h to equal to or smaller than 10 km/h, then the threshold value Vt is within the range from equal to or greater than 4.2 km/h to equal to or smaller than 6 km/h.

For example, the maximum velocity can be obtained based on the history of the velocity information at the time of the entry into the parking slot, and the threshold value Vt can be calculated by multiplying a predetermined coefficient to the maximum velocity. Alternatively, the maximum velocity for each driver can be obtained, and the threshold value Vt can be calculated by multiplying a predetermined coefficient to the maximum velocity.

For example, the maximum velocity can be obtained based on the history of the velocity information at the time of the entry of each unspecified vehicle in the target parking slot, and the threshold value can be calculated by multiplying a predetermined coefficient to the maximum velocity. For the parking with multiple parking slots, the average value of the counts of the turning back of the steering of unspecified vehicles in the whole parking can be calculated without distinguishing the parking slots, and the threshold value can be calculated by multiplying a predetermined coefficient to the average value. The history of the operation information at the time of the entry of each unspecified vehicle into the parking slot is referred to from, for example, a database which is managed by a management company of the parking, an automobile manufacturer or a navigation manufacturer and in which the operation information is collected and stored.

The explanation about the maximum velocity at the time of the entry into the parking slot and the threshold value Vt is given below with reference to FIG. 15. FIG. 15 is a diagram for explaining an example of a change of the velocity of the vehicle at the time of the entry into the parking slot. The relationship between the velocity and time from the backward-driven start position A to the parking completion position B becomes one as illustrated in FIG. 15. With reference to FIG. 15, the maximum velocity between the backward-driven start position A to the parking completion position B is below the threshold value Vt illustrated by a dashed line.

In this way, in the sixth embodiment, based on the velocity information, the determining unit 43 determines that the maximum velocity until the vehicle is parked is equal to or smaller than the predetermined threshold value Vt at the time of the entry into the parking slot.

When the determining unit 43 determines that the velocity is equal to or smaller than the threshold value Vt, the bird's-eye view image generating unit 44 generates the bird's-eye view image 100 at the time of the exit from the parking slot. In the sixth embodiment, when the determining unit 43 determines that the maximum velocity until the vehicle is parked is equal to or smaller than the threshold value Vt, the bird's-eye view image generating unit 44 generates the bird's-eye view image 100.

When the determining unit 43 determines that the velocity at the time of the entry into the parking slot by being driven backward is equal to or smaller than the threshold value Vt, the display controller 48 displays the bird's-eye view image 100 which is generated by the bird's-eye view image generating unit 44 in the display panel 31 at the time of the exit of the vehicle from the parking slot by being driven forward. In the sixth embodiment, when the determining unit 43 determines that the maximum velocity until the vehicle is parked is equal to or smaller than the threshold value Vt, then the display controller 48 displays the bird's-eye view image 100 in the display panel 31.

Explained below with reference to FIGS. 16 and 17 is a flow of processes in the display control device 40 of the display control system 1. FIG. 16 is a flowchart for explaining an exemplary flow of processes in the display control device of the display control system according to the sixth embodiment. FIG. 17 is a flowchart for explaining another exemplary flow of processes in the display control device of the display control system according to the sixth embodiment.

When the display control system 1 is activated, the display control device 40 obtains video data using the video data obtaining unit 41. Then, the display control device 40 obtains vehicle information using the vehicle information obtaining unit 42.

Firstly, the explanation is given about the flow of processes at the time of the entry into the parking slot. The processes from Step ST11 to Step ST14 are identical to the processes from Step S11 to Step S14 illustrated in the flowchart in FIG. 5.

The display control device 40 obtains the velocity information as the vehicle information using the vehicle information obtaining unit 42, and stores the vehicle information in the storage 49 (Step ST15). Then, the display control device 40 ends the processes.

Given below is the explanation of the flow of processes at the time of the exit from the parking slot. The processes at Step ST21, Step ST22, and Step ST25 to Step ST28 are identical to the processes at Step S11, Step S12, and Step S15 to Step S18, respectively, illustrated in the flowchart in FIG. 6.

The display control device 40 obtains the velocity information at the time of the entry into the parking slot (Step ST23). More specifically, based on the vehicle information stored in the storage 49 at the time of the entry into the parking slot, the display control device 40 obtains the velocity information of the vehicle within the parking operation range. Then, the system control proceeds to Step ST24.

The display control device 40 determines whether or not the maximum velocity at the time of the entry into the parking slot is equal to or smaller than the threshold value Vt (Step ST24). When the determination result by the determining unit 43 indicates that the maximum velocity at the time of the entry into the parking slot is not equal to or smaller than the threshold value (No at Step ST24), then the display control device 40 ends the processes. In that case, the bird's-eye view image 100 is not displayed. On the other hand, when the determination result by the determining unit 43 indicates that the maximum velocity attained at the time of the entry into the parking slot is equal to or smaller than the threshold value Vt (Yes at Step ST24), then the system control proceeds to Step ST25.

As described above, in the sixth embodiment, when the determination result by the determining unit 43 indicates that the maximum velocity at the time of the entry into the parking slot is equal to or smaller than the threshold value Vt, then the bird's-eye view image 100 is displayed in the display panel 31. The case in which the maximum velocity at the time of the entry into the parking slot is equal to or smaller than the threshold value Vt is a case in which the parking slot is narrow and the velocity equal to or greater than the threshold value Vt cannot be attained at the time of the entry into the parking slot, or a case in which an obstacle is present. In this way, in the sixth embodiment, according to the velocity at the time of the entry into the parking slot, the bird's-eye view image 100 can be appropriately displayed at the time of the exit from the parking slot. As a result, when the velocity at the time of the entry into the parking slot is slow, such as when an elderly driver, a driver not used to driving, or a driver who performs the parking operation in a cautious manner takes much time for the parking, the driver can appropriately check, at the time of the exit from the parking slot, the surrounding of the vehicle by looking at the bird's-eye view image 100 in addition to performing visual confirmation and looking into the mirror.

According to the sixth embodiment, based on the velocity at the time of the entry into the parking slot, the bird's-eye view image 100 is displayed only when required at the time of the exit from the parking slot. In this way, in the sixth embodiment, a situation in which the bird's-eye view image 100 is displayed even if it is not required can be prevented from occurring, and a situation in which the bird's-eye view image 100 is displayed when the route in the navigation system is to be checked can be prevented from occurring.

Seventh Embodiment

Figure 18:
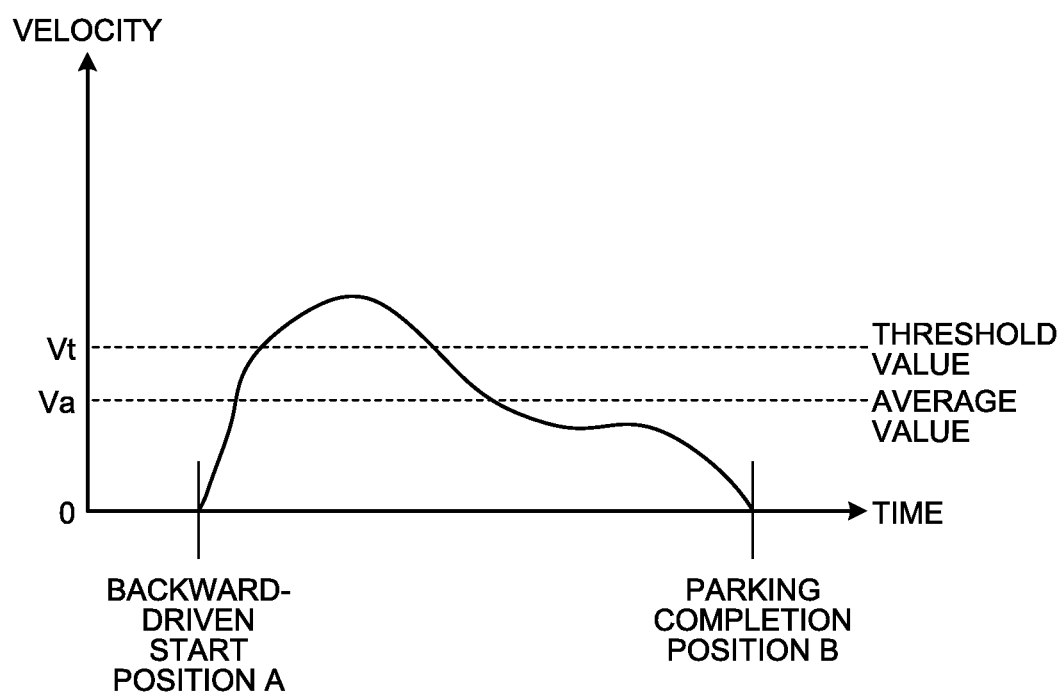
FIG. 18 is a diagram for explaining another example of the change of the velocity of the vehicle at the time of the entry into the parking slot.
Figure 19:
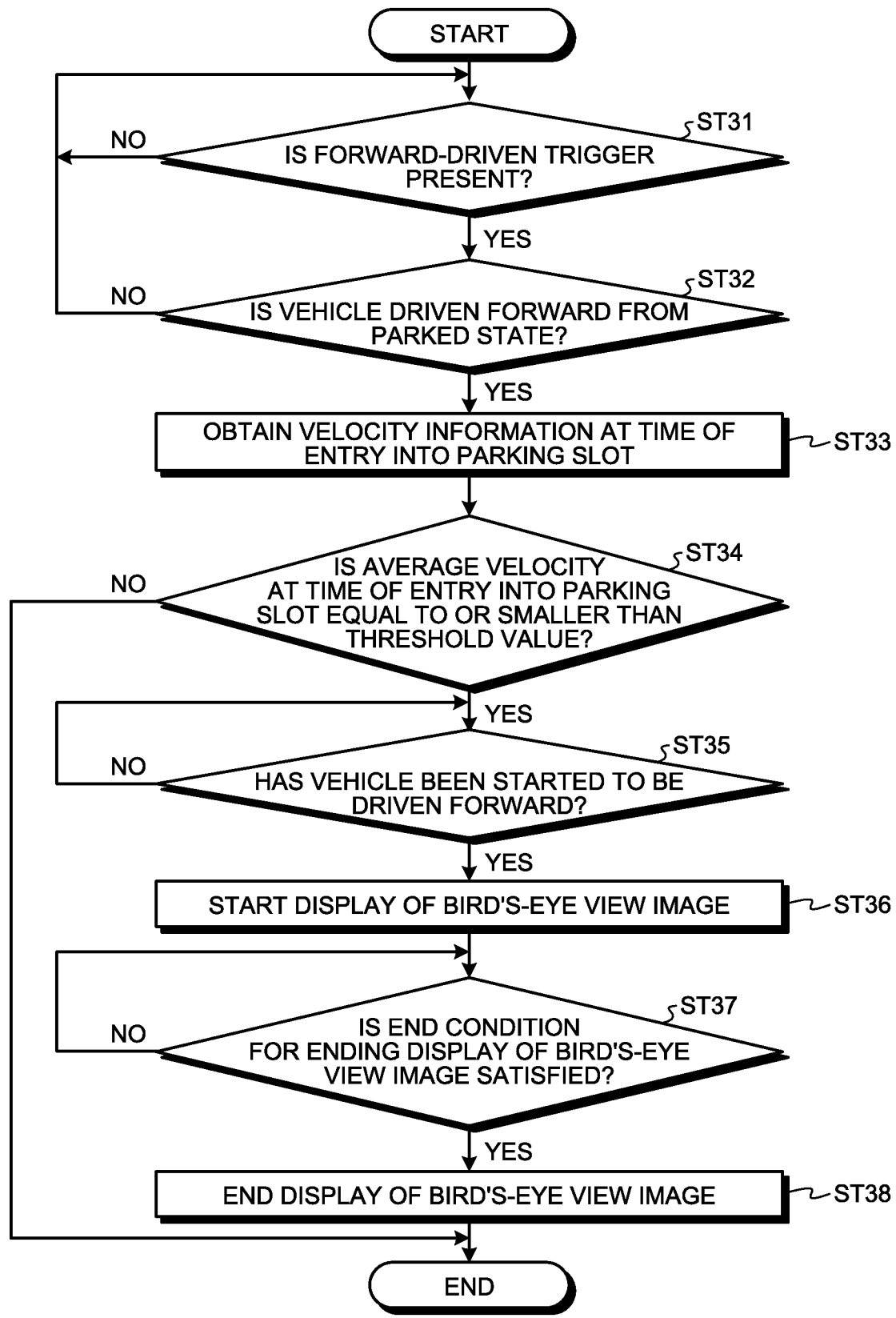
FIG. 19 is a flowchart for explaining an exemplary flow of processes in the display control device of the display control system according to a seventh embodiment.

Explained below with reference to FIGS. 18 and 19 is the display control system 1 according to a seventh embodiment. FIG. 18 is a diagram for explaining another example of the change of the velocity of the vehicle at the time of the entry into the parking slot. FIG. 19 is a flowchart for explaining an exemplary flow of processes in the display control device of the display control system according to the seventh embodiment. The display control system 1 has an identical fundamental configuration to the display control system 1 according to the sixth embodiment. In the following explanation, the constituent elements identical to the display control system 1 are referred to by the same reference numerals, and the detailed explanation is not given again. In the display control system 1, the processes by the determining unit 43 are different from those in the sixth embodiment.

In the seventh embodiment, the threshold value Vt as the comparison velocity information is defined based on the average velocity attained at the time of the entry into the parking slot.

The threshold value Vt can be calculated by, for example, multiplying a predetermined coefficient to the standard average velocity at the time of the entry into the parking slot regardless of the vehicle and the parking slot. For example, when the predetermined coefficient is set to 60%, then the threshold value Vt becomes equal to 60% of the standard average velocity at the time of the entry into the parking slot. For example, when the standard average velocity at the time of the entry into the parking slot is 5 km/h, then the threshold value Vt becomes equal to 3 km/h.

For example, the average velocity can be calculated based on the history of the velocity information at the time of the entry into the parking slot, and the threshold value Vt can be calculated by multiplying a predetermined coefficient to the average velocity. Alternatively, the average velocity for each driver can be obtained, and the threshold value Vt can be calculated by multiplying a predetermined coefficient to the average velocity.

For example, the average velocity can be calculated based on the history of the velocity information at the time of the entry of each unspecified vehicle in the target parking slot, and the threshold value can be calculated by multiplying a predetermined coefficient to the average velocity. For the parking with multiple parking slots, the threshold value can be calculated by multiplying a predetermined coefficient to the average velocity of the unspecified vehicles in the whole parking without distinguishing the parking slots Explained below with reference to FIG. 18 is the average velocity and the threshold value Vt at the time of the entry into the parking slot. The relationship between the velocity and time from the backward-driven start position A to the parking completion position B becomes one as illustrated in FIG. 18. With reference to FIG. 18, an average velocity Va from the backward-driven start position A to the parking completion position B is below the threshold value Vt illustrated by a dashed line.

In this way, in the seventh embodiment, based on the velocity information, the determining unit 43 determines that the average velocity until the vehicle is parked is equal to or smaller than the predetermined threshold value Vt.

When the determining unit 43 determines that the average velocity until the vehicle is parked is equal to or smaller than the predetermined threshold value Vt, then the bird's-eye view image generating unit 44 generates the bird's-eye view image 100.

Moreover, when the determining unit 43 determines that the average velocity until the vehicle is parked is equal to or smaller than the predetermined threshold value Vt, then the display controller 48 displays the bird's-eye view image 100 in the display panel 31.

Explained below with reference to FIG. 19 is a flow of processes in the display control device 40 of the display control system 1 at the time of the exit from the parking slot. In the flowchart illustrated in FIG. 19, the processes from Step ST31 to Step ST33 are identical to the processes from Step ST21 to Step ST23 illustrated in the flowchart in FIG. 17, and the processes from Step ST35 to Step ST38 are identical to the processes from Step ST25 to Step ST28 illustrated in the flowchart in FIG. 17.

The display control device 40 determines whether or not the average velocity at the time of the entry into the parking slot is equal to or smaller than the threshold value Vt (Step ST34). When the determination result by the determining unit 43 indicates that the average velocity at the time of the entry into the parking slot is not equal to or smaller than the threshold value Vt (No at Step ST34), then the display control device 40 ends the processes. In that case, the bird's-eye view image 100 is not displayed. On the other hand, when the determination result by the determining unit 43 indicates that the average velocity at the time of the entry into the parking slot is equal to or smaller than the threshold value Vt (Yes at Step ST34), then the system control proceeds to Step ST35.

As described above, according to the seventh embodiment, when the determining unit 43 determines that the average velocity at the time of the entry into the parking slot is equal to or smaller than the threshold value Vt, then the bird's-eye view image 100 is displayed in the display panel 31. The case in which the average velocity at the time of the entry into the parking slot is equal to or smaller than the threshold value Vt is a case in which the driver performs the parking operation in a cautious manner or a case in which the driver takes too much time for the parking. In most of such cases, some obstacle is present in the surrounding of the target parking slot which forcing the driver to become cautious, or the target parking slot is located at a position in which the parking is not easy. In this way, in the seventh embodiment, according to the average velocity at the time of the entry into the parking slot, the bird's-eye view image 100 can be appropriately displayed at the time of the exit from the parking slot. As a result, when the average velocity at the time of the entry into the parking slot was slow and when the parking operation was not easy, the driver can appropriately check, at the time of the exit from the parking slot, the surrounding of the vehicle by looking at the bird's-eye view image 100 in addition to performing visual confirmation and looking into the mirror.

Eighth Embodiment

Figure 20:
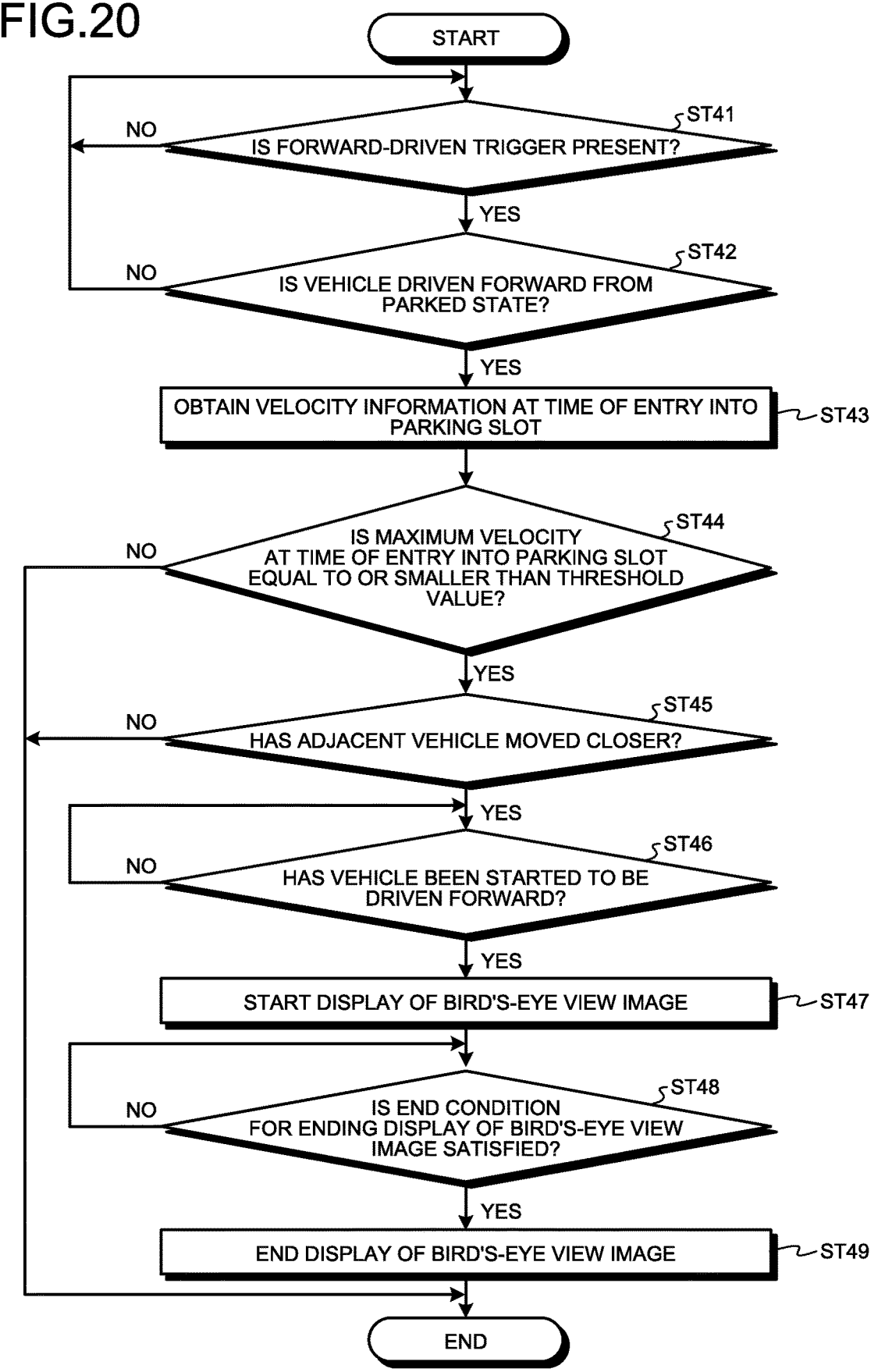
FIG. 20 is a flowchart for explaining an exemplary flow of processes in the display control device of the display control system according to an eighth embodiment.

Explained below with reference to FIG. 20 is the display control system 1A according to an eighth embodiment. FIG. 20 is a flowchart for explaining an exemplary flow of processes in the display control device of the display control system according to the eighth embodiment. The display control system 1A has an identical fundamental configuration to the display control system 1 according to the third and sixth embodiments. The display control system 1A differs from the sixth embodiment in that the adjacent information obtaining unit 45A is included that obtains adjacent information from the sensor unit 21A. In the eighth embodiment, as illustrated in FIG. 11 that is referred to for explanation in the third embodiment, the vehicle V1 is assumed to be parked in the parking slot P1.

The display control system 1A includes the sensor unit 21A in an identical manner to the third embodiment.

In the eighth embodiment, the adjacent information obtaining unit 45A identical to that in the third embodiment corresponds to the obstacle information obtaining unit that obtains the obstacle information about the obstacles present around the vehicle.

In an identical manner to the third embodiment, based on the obstacle information obtained by the adjacent information obtaining unit 45A, the determining unit 43A determines whether or not the change of the surrounding obstacles between at the entry into the parking slot and at the exit from the parking slot satisfies the predetermined condition.

When the determining unit 43A determines that the velocity is equal to or smaller than the threshold value Vt and also determines that the change of the surrounding obstacles between at the entry into the parking slot and at the exit from the parking slot satisfies the predetermined condition, the bird's-eye view image generating unit 44A generates the bird's-eye view image 100.

Moreover, when the determining unit 43A determines that the velocity is equal to or smaller than the threshold value Vt and also determines that the change of the surrounding obstacles between at the entry into the parking slot and at the exit from the parking slot satisfies the predetermined condition, the display controller 48A displays the bird's-eye view image 100 in the display panel 31 at the time of the exit of the vehicle from the parking slot.

Explained below with reference to FIG. 20 is a flow of processes in the display control device 40A of the display control system 1A at the time of the exit from the parking slot. In the flowchart illustrated in FIG. 20, the processes from Step ST41 to Step ST44 are identical to the processes from Step ST21 to Step ST24 illustrated in the flowchart in FIG. 17, and the processes from Step ST46 to Step ST49 are identical to the processes from Step ST25 to Step ST28 illustrated in the flowchart in FIG. 17.

The display control device 40A determines whether or not the adjacent vehicle has moved closer (Step ST45). When the determination result by the determining unit 43A indicates that the position of the adjacent vehicle at the time of the exit from the parking slot has changed to be closer to the vehicle as compared to the position at the time of the entry into the parking slot (Yes at Step ST45), then the system control proceeds to Step ST46. On the other hand, when the determination result by the determining unit 43A indicates that the position of the adjacent vehicle at the time of the exit from the parking slot has not changed to be closer to the vehicle as compared to the position at the time of the entry into the parking slot (No at Step ST45), then the display control device 40A ends the processes.

As described above, according to the eighth embodiment, when the determining unit 43A determines that the velocity is equal to or smaller than the threshold value Vt and also determines that the change of the surrounding obstacles between at the entry into the parking slot and at the exit from the parking slot satisfies the predetermined condition, the bird's-eye view image 100 is displayed in the display panel 31. In this way, in the eighth embodiment, the bird's-eye view image 100 can be appropriately displayed at the time of the exit from the parking slot based on the velocity at the time of the entry into the parking slot and based on the change of the adjacent vehicle. As a result, when the situation at the time of the exit from the parking slot is expected to become difficult, the driver can appropriately check the surrounding of the vehicle by looking at the bird's-eye view image 100 in addition to performing visual confirmation and looking into the mirror.

Meanwhile, the constituent elements of the display control system 1 as illustrated in the drawings are merely conceptual, and need not be physically configured as illustrated. The constituent elements, as a whole or in part, can be separated or integrated either functionally or physically based on various types of loads or use conditions.

The configuration of the display control system 1 is implemented using, for example, programs loaded as software in a memory. In the embodiments described above, the explanation is given about the functional blocks that are implemented as a result of coordination between hardware and software. That is, the functional blocks can be implemented in various forms such as using either only hardware, or using only software, or using hardware and software in combination.

The constituent elements described above include constituent elements that may easily occur to one skilled in the art and include equivalent constituent elements. Moreover, the constituent elements described above can be appropriately combined. Furthermore, the present application is to be construed as embodying various deletions, alternative constructions, and modifications that may occur to one skilled in the art that fairly fall within the basic teaching herein set forth.

The adjacent information obtaining unit 45A obtains the first-type obstacle information and the second-type obstacle information from the sensor unit 21A. However, that is not the only possible case. Alternatively, the adjacent information obtaining unit 45A can perform image processing with respect to the image data obtained by the video data obtaining unit 41, recognize the obstacles present around the vehicle V1 from subjects to be captured, and obtain the information of the obstacles as the first-type obstacle information and the second-type obstacle information.

Although the first-type obstacle information is obtained at the time of the entry of the vehicle V1 into the parking slot by being driven backward, that is not the only possible case. Alternatively, the information about the obstacles present around the vehicle V1 at the time of completion of the parking can be obtained as the first-type obstacle information based on the information obtained during the entry of the vehicle V1 into the parking slot by being driven backward.

Moreover, for example, when it is determined that a current location of the vehicle V1 indicates the parking area based on map information of the navigation system (not illustrated) and current location information of the vehicle V1, or when it is determined that he current location of the vehicle V1 indicates the parking area by performing an image processing with respect to the video data obtained by the video data obtaining unit 41, it can be determined that the vehicle V1 has been parked.

In the embodiments described, the bird's-eye view image 100 is displayed in the display panel 31 when the determining unit 43 determines that the velocity at the time of the entry into the parking slot is equal to or smaller than the threshold value Vt. However, that is not the only possible case. Alternatively, the bird's-eye view image 100 can be displayed in the display panel 31 when the determining unit 43 determines that the velocity at the time of the exit from the parking slot is equal to or smaller than the threshold value Vt. In that case, the average velocity of the vehicles at the time of the exit from the parking slot within the parking operation range is treated as the comparison velocity information, or the threshold value Vt defined based on the maximum velocity is treated as the comparison velocity information. Still alternatively, when a state of zero acceleration continues for a predetermined period of time at the time of the exit from the parking slot or when a predetermined distance is travelled in the state of zero acceleration, the bird's-eye view image 100 can be displayed in the display panel 31. Still alternatively, when the vehicle is decelerated at the time of the exit from the parking slot, the bird's-eye view image 100 can be displayed in the display panel 31.

According to the present application, the bird's-eye view image can be appropriately displayed at the time of the exit from the parking slot by being driven forward.

Although the application has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A display control device comprising:
   a memory that is configured to store computer executable instructions; and
   a processor that is configured to execute the computer executable instructions to perform operations, comprising:
   obtaining video data from multiple cameras which capture images of surrounding of a vehicle;
   performing a viewpoint conversion process and a synthesizing process to the video data to generate an bird's-eye view image;
   obtaining information related to a parking operation of the vehicle within a parking operation range including a parking slot in which the vehicle is to be parked to determine that the parking operation within the parking operation range required time and effort; and
   displaying, when it is determined that the parking operation within the parking operation range required time and effort, the bird's-eye view image in a display at a time of exit of the vehicle from the parking slot by being driven forward, wherein
   whether the parking operation is within the parking operation range required time and effort is determined by determining that at least one of a first condition representing a count of adjustment of a vehicle orientation within the parking operation range is equal to or greater than a predetermined threshold value; a second condition representing a count of a steering adjustment at the time of the exit of the vehicle from the parking slot is equal to or greater than a predetermined threshold value; and a third condition representing obtaining a velocity information at a time of entry of the vehicle into the parking slot by being driven backward and a velocity within the parking operation range is equal to or less than a predetermined threshold value.

2. The display control device according to claim 1, wherein,
   the first condition is determined based on a count of turning back of a steering until the vehicle is parked by being driven backward is equal to or greater than a predetermined threshold value.

3. The display control device according to claim 1, wherein,
   the first condition is determined based on a count of a steering adjustment until the vehicle is parked by being driven backward is equal to or greater than a predetermined threshold value.

4. The display control device according to claim 1, wherein,
   the first condition is determined based on a count of turning back of a steering at the time of the exit of the vehicle from the parking slot is equal to or greater than a predetermined threshold value.

5. The display control device according to claim 1, wherein
   a comparison velocity information at the time of the entry of the vehicle into the parking slot is referable and the third condition is determined when the velocity at the time of the entry of the vehicle into the parking slot is equal to or smaller than the predetermined threshold value defined as the comparison velocity information.

6. The display control device according to claim 1, wherein the operations further comprise obtaining obstacle information about obstacles around the vehicle, wherein
   based on the obstacle information whether or not there is no change of the obstacles around the vehicle between at the entry into the parking slot and at the exit from the parking slot, or whether or not the obstacles around the vehicle at the time of the exit from the parking slot have moved closer to the vehicle as compared to those at the time of the entry into the parking slot is determined, and
   the bird's-eye view image is displayed in the display when it is determined that the parking operation required time and effort, and also it is determined that there is no change of the obstacles around the vehicle between at the entry into the parking slot and at the exit from the parking slot or the obstacles around the vehicle at the time of the exit from the parking slot have moved closer to the vehicle as compared to those at the time of the entry into the parking slot.

7. A display control system comprising:
   a display control device comprising:
      a memory that is configured to store computer executable instructions; and
      a processor that is configured to execute the computer executable instructions to perform operations, comprising:
   obtaining video data from multiple cameras which capture images surrounding of a vehicle;
   performing a viewpoint conversion process and a synthesizing process to the video data to generate a bird's-eye view image;
   obtaining information related to a parking operation of the vehicle within a parking operation range including a parking slot in which the vehicle is to be parked to determine that the parking operation is within the parking operation range required time and effort; and
   displaying, when it is determined that the parking operation within the parking operation range required time and effort, the generated bird's-eye view image in a display at a time of exit of the vehicle from the parking slot by being driven forward; and
   at least either multiple image-capturing units from which the video data obtaining unit obtains the video data, or a display in which the display controller displays the bird's-eye view image.

8. A display control method comprising:
   a video data obtaining step of obtaining video data from multiple cameras which capture images of surrounding of a vehicle;
   an bird's-eye view image generating step of performing a viewpoint conversion process and a synthesizing process to the video data obtained at the video data obtaining step and generating an bird's-eye view image;
   a determining step of obtaining information related to a parking operation of the vehicle within a parking operation range including a parking slot in which the vehicle is to be parked and determining that the parking operation within the parking operation range required time and effort; and a display controlling step of, when it is determined at the determining step that the parking operation within the parking operation range required time and effort, displaying the bird's-eye view image which is generated at the bird's-eye view image generating step at a time of exit of the vehicle from the parking slot by being driven forward, wherein whether the parking operation is within the parking operation range required time and effort is determined by determining that at least one of a first condition representing a count of adjustment of a vehicle orientation within the parking operation range is equal to or greater than a predetermined threshold value; a second condition representing a count of a steering adjustment at the time of the exit of the vehicle from the parking slot is equal to or greater than a predetermined threshold value; and a third condition representing obtaining a velocity information at a time of entry of the vehicle into the parking slot by being driven backward and a velocity within the parking operation range is equal to or less than a predetermined threshold value.

9. A non-transitory storage medium that stores a program that causes a computer, which functions as a display control device, to execute:

a video data obtaining step of obtaining video data from multiple cameras which capture images of surrounding of a vehicle;

an bird's-eye view image generating step of performing a viewpoint conversion process and a synthesizing process to the video data obtained at the video data obtaining step and generating an bird's-eye view image;

a determining step of obtaining information related to a parking operation of the vehicle within a parking operation range including a parking slot in which the vehicle is to be parked and determining that the parking operation within the parking operation range required time and effort; and a display controlling step of, when it is determined at the determining step that the parking operation within the parking operation range required time and effort, displaying the bird's-eye view image which is generated at the bird's-eye view image generating step at a time of exit of the vehicle from the parking slot by being driven forward, wherein whether the parking operation is within the parking operation range required time and effort is determined by determining that at least one of a first condition representing a count of adjustment of a vehicle orientation within the parking operation range is equal to or greater than a predetermined threshold value; a second condition representing a count of a steering adjustment at the time of the exit of the vehicle from the parking slot is equal to or greater than a predetermined threshold value; and a third condition representing obtaining a velocity information at a time of entry of the vehicle into the parking slot by being driven backward and a velocity within the parking operation range is equal to or less than a predetermined threshold value.

* * * * *